US010882983B2

(12) United States Patent
Valenti et al.

(10) Patent No.: US 10,882,983 B2
(45) Date of Patent: Jan. 5, 2021

(54) RUBBER COMPOSITION

(71) Applicant: TRINSEO EUROPE GMBH, Horgen (CH)

(72) Inventors: Silvia Valenti, Halle (DE); Sven Thiele, Halle (DE); Christiane Berndt, Salzatal (DE)

(73) Assignee: TRINSEO EUROPE GMBH, Horgen (CH)

( * ) Notice: Subject to any disclaimer, the term of this patent is extended or adjusted under 35 U.S.C. 154(b) by 102 days.

(21) Appl. No.: 16/301,554

(22) PCT Filed: Jun. 7, 2017

(86) PCT No.: PCT/EP2017/063800
§ 371 (c)(1),
(2) Date: Nov. 14, 2018

(87) PCT Pub. No.: WO2017/211876
PCT Pub. Date: Dec. 14, 2017

(65) Prior Publication Data
US 2019/0375918 A1    Dec. 12, 2019

(30) Foreign Application Priority Data

Jun. 7, 2016   (EP) .................................. 16173299

(51) Int. Cl.
| | | |
|---|---|---|
| *C08L 9/06* | (2006.01) | |
| *B60C 1/00* | (2006.01) | |
| *C08F 8/34* | (2006.01) | |
| *C08F 8/42* | (2006.01) | |
| *C08F 236/06* | (2006.01) | |
| *C08F 236/10* | (2006.01) | |
| *C08K 3/06* | (2006.01) | |
| *C08K 3/22* | (2006.01) | |
| *C08K 3/36* | (2006.01) | |
| *C08K 5/00* | (2006.01) | |
| *C08K 5/09* | (2006.01) | |
| *C08K 5/54* | (2006.01) | |
| *C08L 7/00* | (2006.01) | |
| *C08L 91/00* | (2006.01) | |

(52) U.S. Cl.
CPC .................. *C08L 9/06* (2013.01); *B60C 1/00* (2013.01); *C08F 8/34* (2013.01); *C08F 8/42* (2013.01); *C08F 236/06* (2013.01); *C08F 236/10* (2013.01); *C08K 3/06* (2013.01); *C08K 3/22* (2013.01); *C08K 3/36* (2013.01); *C08K 5/0025* (2013.01); *C08K 5/09* (2013.01); *C08K 5/5403* (2013.01); *C08K 2003/2296* (2013.01); *C08L 7/00* (2013.01); *C08L 91/00* (2013.01)

(58) Field of Classification Search
CPC .. C08F 8/42; C08F 236/10; C08F 8/34; C08F 236/06; C08L 9/00; C08L 9/06; B60C 1/00
USPC ......................................................... 523/156
See application file for complete search history.

(56) References Cited

U.S. PATENT DOCUMENTS

| | | | | |
|---|---|---|---|---|
| 4,537,936 | A | * | 8/1985 | Takao ..................... C08F 36/04 525/236 |
| 8,835,561 | B2 | | 9/2014 | Gandon-Pain et al. |
| 9,447,255 | B2 | | 9/2016 | Tsuji |
| 9,518,172 | B2 | | 12/2016 | Shiono et al. |
| 10,047,173 | B2 | | 8/2018 | Hamann et al. |
| 2006/0121170 | A1 | | 6/2006 | Howard |
| 2012/0108736 | A1 | * | 5/2012 | Chen ........................ C08L 9/00 524/575 |

FOREIGN PATENT DOCUMENTS

| | | | |
|---|---|---|---|
| CN | 101233163 | | 7/2008 |
| CN | 102485459 | | 6/2012 |
| CN | 103562296 | | 2/2014 |
| CN | 104159960 | | 11/2014 |
| CN | 105579475 | | 5/2016 |
| EP | 0590491 | | 4/1994 |
| EP | 0 751 181 | * | 1/1997 |
| EP | 2 289 985 | | 2/2011 |
| JP | 2012-121942 | | 6/2012 |
| TW | 201120108 | | 6/2011 |
| WO | WO 2011/034581 | | 3/2011 |

OTHER PUBLICATIONS

International Search Report dated Sep. 15, 2017 from PCT priority Application No. PCT/EP2017/063800 (three pages).
Written Opinion of the International Searching Authority dated Sep. 17, 2017 from PCT priority Application No. PCT/EP2017/063800 (four pages).
Office Action issued in Chinese Appl. No. 201780035037.X (dated Sep. 7, 2020).
Search Report issued in Appl. No. TW 106118691 (dated Sep. 27, 2020).

* cited by examiner

*Primary Examiner* — Doris L Lee
(74) *Attorney, Agent, or Firm* — Barnes & Thornburg LLP; G. Peter Nichols

(57) ABSTRACT

The present invention relates to polymer blend that includes (a) 50 to 90 percent by weight of a first elastomeric polymer having a high molecular weight, (b) 5 to 50 percent by weight, preferably 5 to 40 percent by weight, more preferably 10 to 35 percent by weight, of a second elastomeric polymer having a low molecular weight and being coupled, wherein the amounts of the components (a) and (b) are based on the total weight of the polymer blend.

17 Claims, No Drawings

RUBBER COMPOSITION

This application is a U.S. nationalization under 35 U.S.C. § 371 of International Patent Application No. PCT/EP2017/063800, filed Jun. 7, 2017, which claims priority to EP Application No. 16173299.5, filed Jun. 7, 2016; the entire contents of each are incorporated herein by reference.

TECHNICAL FIELD

The present invention relates to a polymer blend, a non-cured polymer composition, comprising said polymer blend, and a method for preparing said polymer blend.

BACKGROUND ART

In recent years, there has been an increasing demand for providing polymer blends for the production of tires for the automobile industry which allow an improvement of the tire's performance. Particularly under safety aspects, an optimization of the balance between wet and ice performance for winter tire application became more important.

A typical polymer formulation for the manufacturing of a tire includes an aromatic vinyl-conjugated diene copolymer of high molecular weight, such as a styrene butadiene copolymer or rubber (SBR), which after compounding with several additives, such as a silica filler and a vulcanizing agent, and vulcanization (crosslinking) leads to a tire product having a lower rolling resistance due to the high molecular weight of the SBR component used. Even though providing a tire having an enhanced (i.e. lower) rolling resistance is beneficial, the use of an aromatic vinyl-conjugated diene copolymer having a high molecular weight, and for this reason being associated with a high viscosity, results in less beneficial processability in the course of the further processing steps like compounding and vulcanization (crosslinking).

Therefore, a high molecular weight aromatic vinyl-conjugated diene copolymer is typically extended with an extender oil of low molecular weight for reducing the copolymer's viscosity and guaranteeing good mixing, incorporation and distribution of the copolymer in the subsequent compounding and/or crosslinking steps of the polymer formulation. Typical extender oils (or softeners) are mineral oils and treated mineral oils, such as for example DAE (Distillate Aromatic Extract), TDAE (Treated Distillate Aromatic Extract), MES (Mild Extraction Solvate), RAE (Residual Aromatic Extract) and naphthenic oils. However, the extension of an aromatic vinyl-conjugated diene copolymer with such a low molecular weight extender oil is associated with the following drawbacks:

Since the molecular weight of the common extender oil is relatively low, e.g. about 450 g/mol (converted to polystyrene equivalents) for TDAE, the enhanced processability of the high molecular weight aromatic vinyl-conjugated diene copolymer during the subsequent compounding and vulcanization steps, as mentioned above, is accompanied by a significant increase of the amount of "volatile organic compounds" (herein abbreviated as VOC) in the corresponding final tire product. These VOC emissions become particularly relevant during use of the tire at elevated temperatures.

Another drawback is that the glass temperature and compatibility of these extender oils is more or less fixed and not variable. Thus, when formulating an aromatic vinyl-conjugated diene copolymer, compatibility and subsequent blooming of the extender oil on the vulcanizate surface during storage are relevant factors to be considered. In addition, performance and application field of the vulcanizate, which typically depends on the glass transition temperature, may only be adjusted by variation of the specific composition of the aromatic vinyl-conjugated diene copolymer. However, although an increase of the glass transition temperature of the aromatic vinyl-conjugated diene copolymer which may be achieved by increasing the styrene or vinyl unit content results in an improved wet grip performance, this is also associated with an increase in compound stiffness, particularly at a low temperature, thereby reducing the snow grip performance.

Another drawback of using a common low molecular weight extender oil is that most of these extender oils are intensely colored, ranging from yellow to deep brown. Accordingly, an intense cleaning of the production plant has to be applied prior to changing polymer grades, particularly if a non-oil extended polymer grade is planned for the next production cycle. Such cleaning procedures are, however, time and cost consuming.

Thus, there is a demand for providing alternative extender or softener components as suitable replacement of or in addition to the common extender oils as applied by the prior art, thereby allowing the provision of cross-linked (vulcanized) polymer formulations, which are characterized by having an acceptable processability, as represented by a reduced Mooney viscosity (MU), and a better balance of wet and ice grip performance, as represented by a high tan δ at 0° C. (wet grip) and a low compound stiffness E' at 0° C./−25° C. (ice grip). These needs have been met by the following invention.

SUMMARY OF THE INVENTION

This summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to the invention, it has been surprisingly found out that an elastomeric polymer having a low molecular weight and a branched (or coupled) structure may be beneficially used as alternative extender or softener component as replacement of or in addition to the common prior art extender oils, thereby allowing the provision of cross-linked (vulcanized or cured) polymer formulations, which are characterized by having an acceptable processability, as represented by a reduced Mooney viscosity (MU), and a better balance of wet and ice grip performance in winter tire applications. This elastomeric polymer having a low molecular weight and a branched (or coupled) structure corresponds to the second elastomeric polymer as referred to in the following and the claims.

In a first aspect, a polymer blend is provided, comprising (a) 50 to 95 percent by weight of a first elastomeric polymer having a high molecular weight and being optionally coupled with a coupling agent, (b) 5 to 50 percent by weight, preferably 5 to 40 percent by weight, more preferably 10 to 35 percent by weight, of a second elastomeric polymer having a low molecular weight and being coupled with a coupling agent, wherein the amounts of the components (a) and (b) are based on the total weight of the polymer blend. The first elastomeric polymer is a random polymer and is obtainable by (I) anionic polymerization of at least one conjugated diene monomer and one or more α-olefin monomer(s) in the presence of a polymerization initiator in an organic solvent and (II) optionally coupling of the polymer chains obtained in (I) by a coupling agent. The second elastomeric polymer is obtainable by (i) anionic polymerization of at least one conjugated diene monomer and one or more α-olefin monomer(s) in the presence of a polymerization initiator in an organic solvent, and (ii) coupling the polymer chains obtained in (i) by a coupling agent. Preferably, the coupling rate of the second elastomeric polymer is at least 50 percent by weight such as at least 60 percent by weight or 80 percent by weight.

The polymer chain ends of the first elastomeric polymer obtained in (I) may be preferably modified by addition and reaction of at least one compound represented by any of formula (1), or formula (12), as defined in claim 2.

The polymer chain ends of the first elastomeric polymer obtained in (I) and/or the polymer chain ends of the second elastomeric polymer obtained in (i) may be preferably modified by addition and reaction of at least one compound represented by any of formula (2), as defined in claim 5.

The coupling agent may be preferably at least one compound represented by any of formula (16), formula (II) or formula (III), as defined in claim 6. Particularly preferred are $SiCl_4$, $Si(OCH_3)_4$ or $SnCl_4$.

The polymerization initiator used in (I) may be preferably selected from the group consisting of n-BuLi, sec-BuLi, tert-BuLi, Li—$(CH_2)(Me)_2Si$—N—$(C_4H_9)_2$, Li—$(CH_2)(Me)_2Si$—N—$(C_2H_5)_2$.

The polymerization initiator used in (i) may be preferably selected from the group consisting of n-BuLi, sec-BuLi, tert-BuLi.

The polymerization initiator used in (I) may further be a compound represented by formula (6) or formula (7), as defined in claim 9.

The conjugated diene monomer may be preferably selected from 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene, preferably 1,3-butadiene, and/or 2-methyl-1,3-butadiene.

The α-olefin monomer may be preferably selected from styrene, 2-methylstyrene, 3-methylstyrene, 4-methylstyrene, 2,4-dimethylstyrene, 2,4,6-trimethylstyrene, α-methylstyrene, stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, N,N-bis-(trialkylsilyl)aminostyrene, tert-butoxystyrene, vinylpyridine, divinylbenzene, and/or mixtures thereof; preferably styrene, α-methylstyrene, and/or divinylbenzene.

The first elastomeric polymer (a) may preferably be an optionally coupled and optionally modified styrene-butadiene-copolymer. The second elastomeric polymer (b) may preferably be a coupled and optionally modified styrene-butadiene-copolymer.

The anionic polymerization (I) and/or (i) may be preferably performed in the presence of at least one randomizer, such as ditetrahydrofuyl-propane (DTHFP) and tetramethylene-ethylene-diamine (TMEDA). In (I), the molar ratio of randomizer such as DTHFP to active polymerization initiator is from 1-1.5 mol/mol. In (i), the molar ratio of randomizer such as DTHFP to active polymerization initiator is from 0.1-1 mol/mol.

Preferably, 0-13% by weight of one or more extender oil(s) may be present in the polymer blend, based on the total amount of components (a), (b) and (c).

In a second aspect, a non-cured polymer composition, comprising the polymer blend according to the present disclosure is provided.

In a third aspect, a first method for the preparation of the polymer blend according to present invention is provided, comprising the steps of preparing the first elastomeric polymer by (I) anionic polymerization of at least one conjugated diene monomer and one or more α-olefin monomer(s) in the presence of a polymerization initiator in an organic solvent and (II) optionally coupling the polymer chains obtained in (I) by a coupling agent; preparing the second elastomeric polymer by (i) anionic polymerization of at least one conjugated diene monomer and one or more α-olefin monomer(s) in the presence of a polymerization initiator in an organic solvent and (ii) coupling the polymer chains obtained in (i) by a coupling agent; blending the first and second elastomeric polymer and optionally one or more extender oil(s); solvent removal by e.g. steam stripping; and drying of the resulting polymer blend under heating.

In a fourth aspect, an alternative method for the preparation of the polymer blend according to present disclosure is provided, comprising the steps of in situ-preparing the polymer blend by (i) anionic polymerization of at least one conjugated diene monomer and one or more α-olefin monomer(s) in the presence of a polymerization initiator in an organic solvent and (ii) coupling the polymer chains obtained in (i) by a coupling agent, thereby preparing the second elastomeric polymer, and (I) addition of at least one conjugated diene monomer and one or more α-olefin monomer(s) and (II) optionally coupling the polymer chains obtained in (II) by a coupling agent, thereby preparing the first elastomeric polymer; optionally blending one or more extender oil(s) with the in situ-prepared polymer blend; solvent removal by e.g. steam stripping; and drying of the resulting polymer blend under heating.

In a fifth aspect, a polymer blend obtainable according to any one of the methods of the third and fourth aspects is provided.

DETAILED DESCRIPTION OF THE INVENTION

The verbs "to comprise" and "to include" are used in this document as open limitations that neither exclude nor require the existence of un-recited features. The features recited in depending claims are freely combinable unless otherwise explicitly stated. Furthermore, it is to be understood that the use of "a" or "an", i.e. a singular form, throughout this document does not exclude a plural form.

The term "consisting essentially of" has the meaning that specific further components may be present, namely those not materially affecting the essential characteristics of the polymer blend or polymer composition in question.

Alkyl groups as defined herein, whether as such or in association with other groups, such as alkylaryl or alkoxy, include both straight chain alkyl groups, such as methyl (Me), ethyl (Et), n-propyl (Pr), n-butyl (Bu), n-pentyl, n-hexyl, etc; branched alkyl groups, such as isopropyl, tert-butyl (tBu), etc.; and cyclic alkyl groups, such as cyclohexyl.

Alkoxy groups as defined herein include methoxy (MeO), ethoxy (EtO), propoxy (PrO), butoxy (BuO), isopropoxy, isobutoxy, pentoxy, and the like.

Aryl groups, as defined herein, include phenyl, and biphenyl compounds. Aryl groups preferably contain only one aromatic ring and most preferably contain a $C_6$ aromatic ring, i.e. benzene.

Alkylaryl groups, as defined herein, refer to a combination of one or more aryl groups bound to one or more alkyl groups, for example in the form of alkyl-aryl, aryl-alkyl, alkyl-aryl-alkyl and aryl-alkyl-aryl. Alkylaryl groups preferably contain only one aromatic ring and most preferably contain a $C_6$ aromatic ring.

A copolymer, as defined herein, may comprise a minor amount of third monomer, such as e.g. divinylbenzene, in the range of up to 1 percent by weight, based on the total weight of the polymer.

A random (or statistical) polymer includes two or more types of monomers which are polymerized in a non-regular or non-consistent way, i.e. the sequence of monomers within the polymer chain follows a statistical rule.

A block copolymer consists essentially of two types of monomers which are polymerized in a regular or consistent way, thereby forming two or more homopolymer subunits which are linked by covalent bonds.

The Polymer Blend

The polymer blend according to the first aspect of the invention comprises, or consists essentially of, or consists of, a first elastomeric polymer having a high molecular weight (herein also referred to as "component (a)"), a second elastomeric polymer having a low molecular weight (herein also referred to as "component (b)") and optionally an (conventional) extender oil having a low molecular weight (herein also referred to as "component (c)").

Component (a)—the High Molecular Weight Elastomeric Polymer

Component (a) is a random polymer and is obtainable by (I) anionic polymerization of at least one conjugated diene monomer and one or more α-olefin monomer(s) in the presence of a polymerization initiator in an organic solvent. Further, the polymer chains obtained in (I) may optionally be coupled (or branched) by a coupling agent as defined below. Optionally, the polymer chains obtained in (I) or (II), if applicable, may be modified by a modification agent as defined below.

Specific monomer(s) and suitable conditions for the anionic polymerization reaction and the coupling reaction/modification reaction, if applicable, are described below in more detail.

Further to the following specific disclosure, generally applicable polymerization technologies including polymerization initiator compounds, polar coordinator compounds and accelerators (for increasing/changing the reactivity of the initiator, for randomly arranging aromatic vinyl monomers and/or for randomly arranging and/or changing the concentration of 1,2-polybutadiene or 1,2-polyisoprene or 3,4-polyisoprene units introduced in the polymer), suitable amounts of the reagents, suitable monomer(s), and suitable process conditions are described in WO 2009/148932, which is entirely incorporated herein by reference.

Anionic Polymerization

Representative conjugated diene monomers may include, but are not limited to, 1,3-butadiene, 2-alkyl-1,3-butadiene, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and combinations thereof. Preferred are 1,3-butadiene, isoprene, and combinations thereof.

Suitable examples of α-olefin monomers may include, but are not limited to, styrene and its derivatives, including, without limitation, $C_{1-4}$ alkyl substituted styrenes, such as 2-methylstyrene, 3-methylstyrene, α-methylstyrene, 2,4-dimethylstyrene, 2,4,6-trimethylstyrene, α-methylstyrene, and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, N,N-bis-(trialkylsilyl)aminostyrene, tert-butoxystyrene, vinylpyridine, divinylbenzene, including 1,2-divinylbenzene, 1,3-divinylbenzene and 1,4-divinylbenzene, and/or mixtures thereof. Most preferably, styrene, α-methylstyrene, and/or divinylbenzene, including 1,2-divinylbenzene, 1,3-divinylbenzene and 1,4-divinylbenzene, are used as the at least one α-olefin monomer, as defined in claim 1.

Typically, the polymerization of the monomers, i.e. the at least one conjugated diene monomer and the one or more α-olefin monomer(s), as described above, may be carried out at a temperature above 0° C. In a preferred embodiment, the temperature of the polymerization is in the range of 20° C.-110° C., more preferably in the range of 30° C.-95° C.

An organic solvent may be suitably used for the polymerization reaction. In one embodiment, the polymerization solvent is selected from non-polar aromatic and non-aromatic solvents including, without limitation, butane, butene, pentane, cyclohexane, toluene, hexane, heptane and octane. In a preferred embodiment, the solvent is selected from butane, butene, cyclohexane, hexane, heptane, toluene or mixtures thereof.

Preferably, the solid content of the monomers to be polymerized may be from 5 to 35 percent by weight, more preferably from 10 to 30 percent by weight, and most preferably from 15 to 25 percent by weight, based on the total weight of monomers and solvent. The term "total solid content of monomers" (herein abbreviated as TSC), "solid content of monomers", or similar terms, as used herein, refers to the total mass (or weight) percentage of monomers, based on the total weight of solvent and monomers (e.g. 1,3-butadiene and styrene).

The polymerization initiator is suitably an alkyl lithium compound, such as ethyl lithium, propyl lithium, n-butyl lithium, sec-butyl lithium, tert-butyl lithium, phenyl lithium, hexyl lithium, 1,4-dilithio-n-butane, a compound represented by the following formula (6) or formula (7), or Lewis base adducts thereof. Mixtures of these polymerization initiators may also be employed.

formula (6)

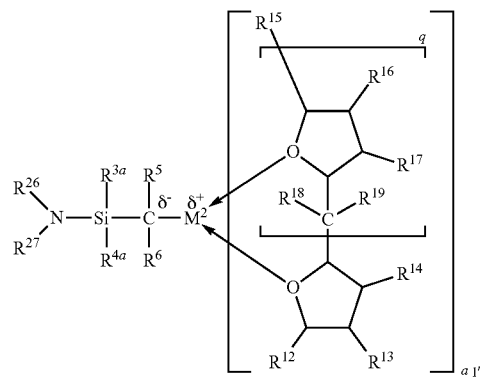

-continued

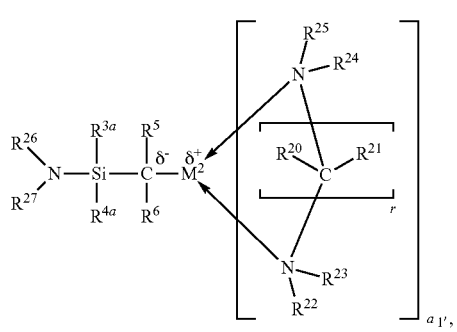

formula (7)

wherein $R^{3a}$ is independently selected from $-N(R^{28})R^{29}$, $C_1$-$C_{18}$ alkyl, $C_6$-$C_{18}$ aryl and ($C_7$-$C_{18}$) aralkyl; $R^{4a}$ is independently selected from $-N(R^{30a})$ $R^{31a}$, ($C_1$-$C_{18}$) alkyl, ($C_6$-$C_{18}$) aryl and ($C_7$-$C_{18}$) aralkyl; $R^5$ and $R^6$ are each independently selected from hydrogen, $C_1$-$C_{18}$ alkyl, $C_6$-$C_{18}$ aryl and $C_7$-$C_{18}$ aralkyl; $M^2$ is lithium; $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ are each independently selected from hydrogen, $C_1$-$C_{18}$ alkyl, $C_6$-$C_{18}$ aryl and $C_7$-$C_{18}$ aralkyl; $R^{26}$, $R^{27}$, $R^{28}$, $R^{29}$, $R^{30a}$ and $R^{31a}$ are each independently selected from $C_1$-$C_{18}$ alkyl, $C_6$-$C_{18}$ aryl and $C_7$-$C_{18}$ aralkyl; q is selected from an integer of 1, 2, 3, 4 and 5; and r is selected from an integer of 1, 2 and 3; and $a_1$, is selected from an integer of 0 or 1.

In a preferred embodiment, $R^{3a}$, $R^{4a}$, $R^{22}$, $R^{23}$, $R^{24}$, $R^{25}$, $R^{26}$ and $R^{27}$ are each independently selected from ($C_1$-$C_{18}$) alkyl; $R^5$, $R^6$, $R^{18}$, $R^{19}$, $R^{20}$ and $R^{21}$ are each independently selected from hydrogen and ($C_1$-$C_{18}$) alkyl; and $R^{12}$, $R^{13}$, $R^{14}$, $R^{15}$, $R^{16}$ and $R^{17}$ are each independently selected from hydrogen and ($C_1$-$C_6$) alkyl; and the remaining groups and parameters are defined as in formula (6) and formula (7) above.

Useful amino silane polymerization initiators of formula (6) and (7) include the following:

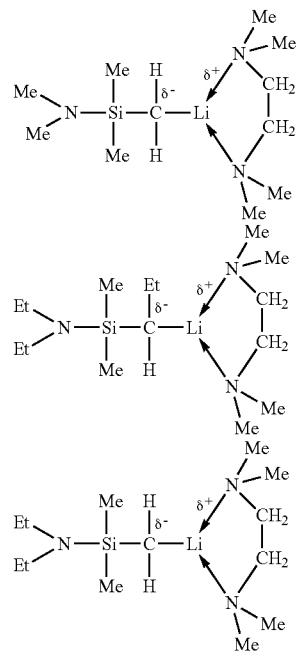

-continued

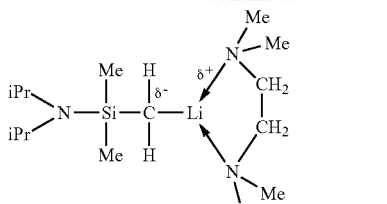

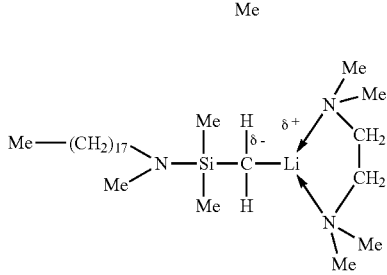

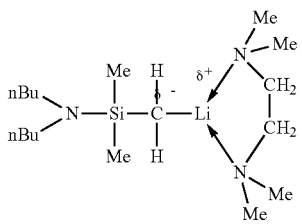

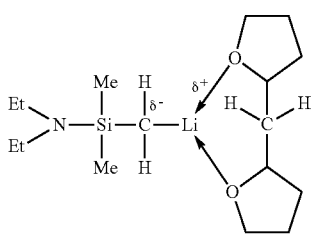

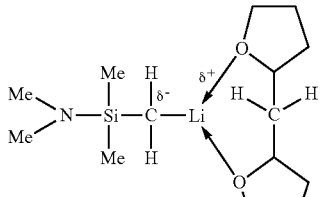

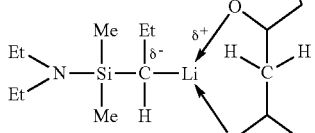

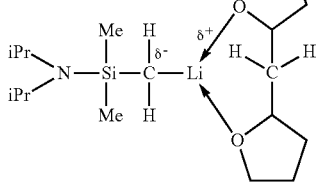

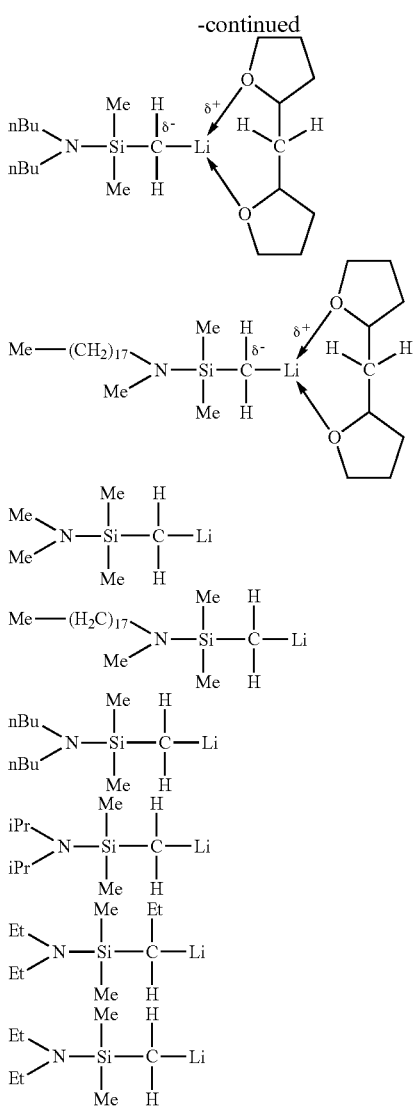

or Lewis base adducts thereof, and/or mixtures thereof.

Amino silane polymerization initiators, as described above, are disclosed in more detail in WO 2014/040640 which is entirely incorporated by reference.

Most preferably, n-butyl lithium, sec-butyl lithium, or a compound of formula (6) or formula (7), in particular

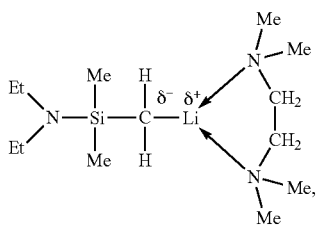

is used. The above initiators may be used alone or in combination as a mixture of two or more different types.

Coupling Reaction

In preferred embodiments, the polymer chain ends of component (a) obtained in the anionic polymerization reaction (I) as described above may be coupled (or branched) in an additional coupling reaction step with at least one coupling agent represented by any of formula (16), formula (II) or formula (III), as defined below.

$$(R^{100})_{a100}(Z^{**}))X_{b100} \qquad \text{formula (16)},$$

$$(R^{100}O)_{a100}(Z^{**}))X_{b100} \qquad \text{formula (II)},$$

$$(R^{100}O)_{b100}(Z^{**})(R^{100})_{a100} \qquad \text{formula (III)},$$

wherein $Z^{**}$ is tin or silicon; $X_{b100}$ is independently selected from chlorine, bromine and iodine; $R^{100}$ is independently selected from the group consisting of $(C_1$-$C_{20})$ alkyl, $(C_3$-$C_{20})$ cycloalkyl, $(C_6$-$C_{16})$ aryl and $(C_7$-$C_{16})$ aralkyl; a100 is independently an integer from 0 to 1 and b100 is independently an integer from 3 to 4, provided that a+b=4.

Preferred examples of coupling agents may include, without limitation, $SiCl_4$, $Si(OCH_3)_4$ and $SnCl_4$.

In the coupling step, one or more coupling agents of formula (16), formula (II) and/or formula (III), as defined above, may be added to the living polymer in an amount such that the molar ratio is of from 0.05 to 0.7, preferably of from 0.07 to 0.4, more preferably of from 0.09 to 0.3.

These coupling agent(s) may be preferably added at almost complete or complete conversion of the monomer(s) to be polymerized, preferably at a conversion rate of the anionic polymerization of higher than 85 percent by weight, based on the amount of monomers provided. The phrase "amount of monomers provided", "charged amount of monomers", or similar terms, as used herein, refer to the amount of monomers provided in the polymerization step. In a preferred embodiment, the conversion rate is at least 92.0 percent by weight, preferably higher than 94.0 percent by weight, based on the amount of monomers provided. The term "monomer conversion", as used herein, refers to the monomer conversion (for example the sum conversion of styrene and 1,3-butadiene) determined, e.g. at the outlet of a given polymerization reactor.

Preferably, a substantial amount of the living polymer chain ends is not terminated prior to the reaction with the modification compound, i.e. the living polymer chain ends are present and capable of reacting with the coupling agent in a polymer chain end modification reaction. In the course of the modification reaction, one or more polymer chain(s) may react with the coupling agent, thereby coupling or branching the polymer chains.

Accordingly, the coupling reaction, as described above, results in coupled or branched first elastomeric polymers. In one embodiment, these elastomeric polymers have a degree of branching (=number of polymer arms/chains at the coupling point) of at least 2, such as 2 or 3 or 4. The obtained degree of branching depends on the type of coupling agent used. For instance, $SnCl_4$ as coupling agents will allow for a degree of branching of up to 4, whereas $SnCH_3Cl_3$ will allow for a degree of branching of up to 3, etc.

The coupling rate (portion of coupled polymer expressed in percent by weight and determined by GPC) of the first elastomeric polymer may be 20% by weight to 75% by weight, preferably 25-60% by weight.

The coupling agent may be directly added to the polymer solution without dilution. However, it may be beneficial to add the coupling agent in solution using an inert solvent, e.g. a solvent, as described above.

In general, it is to be understood that the term "coupling" may not be interchanged with "modification" or "functionalization". The latter refers to a chain end modification reaction between one single polymer chain end and one or more modification agent(s) which does not result in branching of the polymer. In contrast, "coupling" or "branching" corresponds to a chain end modification reaction between more than two single polymer chain ends and one or more coupling agent(s). Coupling between more than two single polymer chain ends and one coupling agent results in branched polymer macromolecules or formation of star shaped polymer macromolecules. Chain end modification reaction between more than two single polymer chain ends and one coupling agent results in polymer macromolecules comprising three or more arms at the coupling point. The second elastomeric polymer comprises 20% or more, preferably 40% or more of polymer macromolecules, which are formed through coupling of three or more polymer chain ends at the selected coupling agent(s).

For instance, up to four living polymer chain ends may react with $SnCl_4$ as coupling agent, thereby coupling the polymer chains together. The obtained polymer may have a maximum of four arms.

Compounds of formula (2) (see below) may act as coupling agent as well, provided two or more $R_{10}$ groups react with living polymer chain ends.

Modification Reaction

In preferred embodiments, the polymer chain ends of component (a) obtained in the anionic polymerization reaction (I) as described above may be modified in an additional modification (or functionalization) reaction step with at least one compound of formula (1), formula (2) and/or formula (12), as defined below.

$(R^{*}O)_x(R^{})_y\text{Si-A-S}—SiR^{}_3$  formula (1), wherein each of $R^{}$ is independently selected from $C_1\text{-}C_{16}$ alkyl or alkylaryl; $R^{*}$ is independently selected from $C_1\text{-}C_4$ alkyl; A is selected from $C_6\text{-}C_{18}$ aryl, $C_7\text{-}C_{50}$ alkylaryl, $C_1\text{-}C_{50}$ alkyl and $C_2\text{-}C_{50}$ dialkylether; and optionally $R^{}$, $R^{*}$, or A may independently be substituted with one or more groups, selected from $C_1\text{-}C_4$ alkyl, $C_1\text{-}C_4$ alkoxy, $C_6\text{-}C_{12}$ aryl, $C_7\text{-}C_{16}$ alkylaryl, di($C_1\text{-}C_7$ hydrocarbyl)amino, bis(tri($C_1\text{-}C_{12}$ alkyl)silyl)amino, tris($C_1\text{-}C_7$ hydrocarbyl)silyl and $C_1\text{-}C_{12}$ thioalkyl; x is an integer selected from 1, 2 and 3; y is an integer selected from 0, 1 and 2; provided that x+y=3, More preferably, each of $R^{*}$ are independently selected from methyl, ethyl, iso-propyl, n-propyl, n-butyl, iso-butyl, or tert.-butyl; each of $R^{**}$ are independently selected from $C_1\text{-}C_6$ alkyl, $C_6\text{-}C_{12}$ aryl, or $C_7\text{-}C_{10}$ aralkyl; and A is —$(CH_2)_N$— wherein N is an integer selected from 1, 2, 3, 4, 5 or 6.

Preferred examples of compounds represented by formula (1) as modification agent(s) may include, without limitation, $(MeO)_3Si$—$(CH_2)_3$—S—$SiMe_3$, $(EtO)_3Si$—$(CH_2)_3$—S—$SiMe_3$, $(PrO)_3Si$—$(CH_2)_3$—S—$SiMe_3$, $(BuO)_3Si$—$(CH_2)_3$—S—$SiMe_3$, $(MeO)_3Si$—$(CH_2)_2$—S—$SiMe_3$, $(EtO)_3Si$—$(CH_2)_2$—S—$SiMe_3$, $(PrO)_3Si$—$(CH_2)_2$—S—$SiMe_3$, $(BuO)_3Si$—$(CH_2)_2$—S—$SiMe_3$, $(MeO)_3Si$—$CH_2$—S—$SiMe_3$, $(EtO)_3Si$—$CH_2$—S—$SiMe_3$, $(PrO)_3Si$—$CH_2$—S—$SiMe_3$, $(BuO)_3Si$—$CH_2$—S—$SiMe_3$, $(MeO)_3Si$—$CH_2$—$CMe_2$—$CH_2$—S—$SiMe_3$, $(EtO)_3Si$—$CH_2$—$CMe_2$—$CH_2$—S—$SiMe_3$, $(PrO)_3Si$—$CH_2$—$CMe_2$—$CH_2$—S—$SiMe_3$, $(BuO)_3Si$—$CH_2$—$CMe_2$—$CH_2$—S—$SiMe_3$, $(MeO)_3Si$—$CH_2$—$C(H)Me$-$CH_2$—S—$SiMe_3$, $(EtO)_3Si$—$CH_2$—$C(H)Me$-$CH_2$—S—$SiMe_3$, $(PrO)_3Si$—$CH_2$—$C(H)Me$-$CH_2$—S—$SiMe_3$, $(BuO)_3Si$—$CH_2$—$C(H)Me$-$CH_2$—S—$SiMe_3$, $(MeO)_3Si$—$(CH_2)_3$—S—$SiEt_3$, $(EtO)_3Si$—$(CH_2)_3$—S—$SiEt_3$, $(PrO)_3Si$—$(CH_2)_3$—S—$SiEt_3$, $(BuO)_3Si$—$(CH_2)_3$—S—$SiEt_3$, $(MeO)_3Si$—$(CH_2)_2$-S-$SiEt_3$, $(EtO)_3Si$—$(CH_2)_2$—S—$SiEt_3$, $(PrO)_3Si$—$(CH_2)_2$—S—$SiEt_3$, $(BuO)_3Si$—$(CH_2)_2$—S—$SiEt_3$, $(MeO)_3Si$—$CH_2$—S—$SiEt_3$, $(EtO)_3Si$—$CH_2$—S-$SiEt_3$, $(PrO)_3Si$—$CH_2$—S—$SiEt_3$, $(BuO)_3Si$—$CH_2$—S—$SiEt_3$, $(MeO)_3Si$—$CH_2$—$CMe_2$—$CH_2$—S—$SiEt_3$, $(EtO)_3Si$—$CH_2$—$CMe_2$—$CH_2$—S—$SiEt_3$, $(PrO)_3Si$—$CH_2$—$CMe_2$—$CH_2$—S—$SiEt_3$, $(BuO)_3Si$—$CH_2$—$CMe_2$—$CH_2$—S—$SiEt_3$, $(MeO)_3Si$—$CH_2$—$C(H)Me$-$CH_2$—S—$SiEt_3$, $(EtO)_3Si$—$CH_2$—$C(H)Me$-$CH_2$—S—$SiEt_3$, $(PrO)_3Si$—$CH_2$—$C(H)Me$-$CH_2$—S—$SiEt_3$, $(BuO)_3Si$—$CH_2$—$C(H)Me$-$CH_2$—S—$SiEt_3$, $(MeO)_3Si$—$(CH_2)_3$—S—$SiMe_2tBu$, $(EtO)_3Si$—$(CH_2)_3$—S—$SiMe_2tBu$, $(PrO)_3Si$—$(CH_2)_3$—S—$SiMe_2tBu$, $(BuO)_3Si$—$(CH_2)_3$—S—$SiMe_2tBu$, $(MeO)_3Si$—$(CH_2)_2$—S—$SiMe_2tBu$, $(EtO)_3Si$—$(CH_2)_2$—S—$SiMe_2tBu$, $(PrO)_3Si$—$(CH_2)_2$—S—$SiMe_2tBu$, $(BuO)_3Si$—$(CH_2)_2$—S—$SiMe_2tBu$, $(MeO)_3Si$—$CH_2$—S—$SiMe_2tBu$, $(EtO)_3Si$—$CH_2$—S—$SiMe_2tBu$, $(PrO)_2Si$—$CH_2$—S—$SiMe_2tBu$, $(BuO)_3Si$—$CH_2$—S—$SiMe_2tBu$, $(MeO)_3Si$—$CH_2$—$CMe_2$—$CH_2$—S—$SiMe_2tBu$, $(EtO)_3Si$—$CH_2$—$CMe_2$—$CH_2$—S—$SiMe_2tBu$, $(PrO)_3Si$—$CH_2$—$CMe_2$—$CH_2$—S—$SiMe_2tBu$, $(BuO)_3Si$—$CH_2$—$CMe_2$—$CH_2$—S—$SiMe_2tBU$, $(MeO)_3Si$—$CH_2$—$C(H)Me$-$CH_2$—S—$SiMe_2tBu$, $(EtO)_3Si$—$CH_2$—$C(H)Me$-$CH_2$—S—$SiMe_2tBu$, $(PrO)_3Si$—$CH_2$—$C(H)Me$-$CH_2$—S—$SiMe_2tBu$, $(BuO)_3Si$—$CH_2$—$C(H)Me$-$CH_2$—S—$SiMe_2tBu$, $(MeO)_2MeSi$—$(CH_2)_3$—S—$SiMe_3$, $(EtO)_2MeSi$—$(CH_2)_3$—S—$SiMe_3$, $(PrO)_2MeSi$—$(CH_2)_3$—S—$SiMe_3$, $(BuO)_2MeSi$—$(CH_2)_3$—S—$SiMe_3$, $(MeO)_2MeSi$—$(CH_2)_2$—S—$SiMe_3$, $(EtO)_2MeSi$—$(CH_2)_2$—S—$SiMe_3$, $(PrO)_2MeSi$—$(CH_2)_2$—S—$SiMe_3$, $(BuO)_2MeSi$—$(CH_2)_2$—S—$SiMe_3$, $(MeO)_2MeSi$—$CH_2$—S—$SiMe_3$, $(EtO)_2MeSi$—$CH_2$—S—$SiMe_3$, $(PrO)_2MeSi$—$CH_2$—S—$SiMe_3$, $(BuO)_2MeSi$—$CH_2$—S—$SiMe_3$, $(MeO)_2MeSi$—$CH_2$—$CMe_2$—$CH_2$—S—$SiMe_3$, $(EtO)_2MeSi$—$CH_2$—$CMe_2$—$CH_2$—S—$SiMe_3$, $(PrO)_2MeSi$—$CH_2$—$CMe_2$—$CH_2$—S—$SiMe_3$, $(BuO)_2MeSi$—$CH_2$—$CMe_2$—$CH_2$—S—$SiMe_3$, $(MeO)_2MeSi$—$CH_2$—$C(H)Me$-$CH_2$—S—$SiMe_3$, $(EtO)_2MeSi$—$CH_2$—$C(H)Me$-$CH_2$—S—$SiMe_3$, $(PrO)_2MeSi$—$CH_2$—$C(H)Me$-$CH_2$—S—$SiMe_3$, $(BuO)_2MeSi$—$CH_2$—$C(H)Me$-$CH_2$—S—$SiMe_3$, $(MeO)_2MeSi$—$(CH_2)_3$—S—$SiEt_3$, $(EtO)_2MeSi$—$(CH_2)_3$—S—$SiEt_3$, $(PrO)_2MeSi$—$(CH_2)_3$—S—$SiEt_3$, $(BuO)_2MeSi$—$(CH_2)_3$—S—$SiEt_3$, $(MeO)_2MeSi$—$(CH_2)_2$—S—$SiEt_3$, $(EtO)_2MeSi$—$(CH_2)_2$—S—$SiEt_3$, $(PrO)_2MeSi$—$(CH_2)_2$—S—$SiEt_3$, $(BuO)_2MeSi$—$(CH_2)_2$—S—$SiEt_3$, $(MeO)_2MeSi$—$CH_2$—S—$SiEt_3$, $(EtO)_2MeSi$—$CH_2$—S—$SiEt_3$, $(PrO)_2MeSi$—$CH_2$—S—$SiEt_3$, $(BuO)_2MeSi$—$CH_2$—S—$SiEt_3$, $(MeO)_2MeSi$—$CH_2$—$CMe_2$—$CH_2$—S—$SiEt_3$, $(EtO)_2MeSi$—$CH_2$—$CMe_2$—$CH_2$—S—$SiEt_3$, $(PrO)_2MeSi$—$CH_2$—$CMe_2$—$CH_2$—S—$SiEt_3$, $(BuO)_2MeSi$—$CH_2$—$CMe_2$—$CH_2$—S—$SiEt_3$, $(MeO)_2MeSi$—$CH_2$—$C(H)Me$-$CH_2$—S—$SiEt_3$, $(EtO)_2MeSi$—$CH_2$—$C(H)Me$-$CH_2$—S—$SiEt_3$, $(PrO)_2MeSi$—$CH_2$—$C(H)Me$-$CH_2$—S—$SiEt_3$, $(BuO)_2MeSi$—$CH_2$—$C(H)Me$-$CH_2$—S-$SiEt_3$, $(MeO)_2MeSi$—$(CH_2)_3$—S—$SiMe_2tBu$, $(EtO)_2MeSi$—$(CH_2)_3$—S—$SiMe_2tBu$, $(PrO)_2MeSi$—$(CH_2)_3$—S—$SiMe_2tBu$, $(BuO)_2MeSi$—$(CH_2)_3$—S—$SiMe_2tBu$, $(MeO)_2MeSi$—$(CH_2)_2$—S—$SiMe_2tBu$, $(EtO)_2MeSi$—$(CH_2)_2$—S—$SiMe_2tBu$, $(PrO)_2MeSi$—$(CH_2)_2$—S—$SiMe_2tBu$, $(BuO)_2MeSi$—$(CH_2)_2$—S—$SiMe_2tBu$, $(MeO)_2MeSi$—$CH_2$—S—$SiMe_2tBu$, $(EtO)_2MeSi$—$CH_2$—S—$SiMe_2tBu$, $(PrO)_2MeSi$—$CH_2$—S—$SiMe_2tBu$, $(BuO)_2MeSi$—$CH_2$—S—$SiMe_2tBu$, $(MeO)_2MeSi$—$CH_2$—$CMe_2$—$CH_2$—S—$SiMe_2tBu$, $(EtO)_2MeSi$—$CH_2$—$CMe_2$—$CH_2$—S—$SiMe_2tBu$ $(PrO)_2MeSi$—$CH_2$—$CMe_2$—$CH_2$—S—$SiMe_2tBu$ $(BuO)_2MeSi$—$CH_2$—$CMe_2$—$CH_2$—S—$SiMe_2tBu$, $(MeO)_2MeSi$—$CH_2$—$C(H)Me$-$CH_2$—S—$SiMe_2tBu$, $(EtO)_2MeSi$—$CH_2$—$C(H)Me$-$CH_2$—S—$SiMe_2tBu$, $(PrO)_2MeSi$—$CH_2$—$C(H)Me$-$CH_2$—S—$SiMe_2tBu$, $(BuO)_2MeSi$—$CH_2$—$C(H)Me$-$CH_2$—S—$SiMe_2tBu$, $(MeO)Me_2Si$—$(CH_2)_3$—S—$SiMe_3$, (EtO)

Me₂Si—(CH₂)₃—S—SiMe₃, (PrO)Me₂Si—(CH₂)₃—S—SiMe₃, (BuO)Me₂Si—(CH₂)₃—S—SiMe₃, (MeO)Me₂Si—(CH₂)₂—S—SiMe₃, (EtO)Me₂Si—(CH₂)₂—S—SiMe₃, (PrO)Me₂Si—(CH₂)₂—S—SiMe₃, (BuO)Me₂Si—(CH₂)₂—S—SiMe₃, (MeO)Me₂Si—CH₂—S—SiMe₃, (EtO)Me₂Si—CH₂—S—SiMe₃, (PrO)Me₂Si—CH₂—S—SiMe₃, (BuO)Me₂Si—CH₂—S—SiMe₃, (MeO)Me₂Si—CH₂—CMe₂—CH₂—S—SiMe₃, (EtO)Me₂Si—CH₂—CMe₂—CH₂—S—SiMe₃, (PrO)Me₂Si—CH₂—CMe₂—CH₂—S—SiMe₃, (BuO)Me₂Si—CH₂—CMe₂—CH₂—S—SiMe₃, (MeO)Me₂Si—CH₂—C(H)Me-CH₂—S—SiMe₃, (EtO)Me₂Si—CH₂—C(H)Me-CH₂—S—SiMe₃, (PrO)Me₂Si—CH₂—C(H)Me-CH₂—S—SiMe₃, (BuO)Me₂Si—CH₂—C(H)Me-CH₂—S—SiMe₃, (MeO)Me₂Si—(CH₂)₃—S—SiEt₃, (EtO)Me₂Si—(CH₂)₃—S—SiEt₃, (PrO)Me₂Si—(CH₂)₃—S—SiEt₃, (BuO)Me₂Si—(CH₂)₃—S—SiEt₃, (MeO)Me₂Si—(CH₂)₂—S—SiEt₃, (EtO)Me₂Si—(CH₂)₂—S—SiEt₃, (PrO)Me₂Si—(CH₂)₂—S—SiEt₃, (BuO)Me₂Si—(CH₂)₂—S—SiEt₃, (MeO)Me₂Si—CH₂—S—SiEt₃, (EtO)Me₂Si—CH₂—S—SiEt₃, (PrO)Me₂Si—CH₂—S—SiEt₃, (BuO)Me₂Si—CH₂—S—SiEt₃, (MeO)Me₂Si—CH₂—CMe₂—CH₂—S-SiEt₃, (EtO)Me₂Si—CH₂—CMe₂—CH₂—S—SiEt₃, (PrO)Me₂Si—CH₂—CMe₂—CH₂—S—SiEt₃, (BuO)Me₂Si—CH₂—CMe₂—CH₂—S—SiEt₃, (MeO)Me₂Si—CH₂—C(H)Me-CH₂—S—SiEt₃, (EtO)Me₂Si—CH₂—C(H)Me-CH₂—S—SiEt₃, (PrO)Me₂Si—CH₂—C(H)Me-CH₂—S—SiEt₃, (BuO)Me₂Si—CH₂—C(H)Me-CH₂-S-SiEt₃, (MeO)Me₂Si—(CH₂)₃—S—SiMe₂tBu, (EtO)Me₂Si—(CH₂)₃—S—SiMe₂tBu, (PrO)Me₂Si—(CH₂)₃—S—SiMe₂tBu, (BuO)Me₂Si—(CH₂)₃—S—SiMe₂tBu, (MeO)Me₂Si—(CH₂)₂—S—SiMe₂tBu, (EtO)Me₂Si—(CH₂)₂—S—SiMe₂tBu, (PrO)Me₂Si—(CH₂)₂—S—SiMe₂tBu, (BuO)Me₂Si—(CH₂)₂—S—SiMe₂tBu, (MeO)Me₂Si—CH₂—S—SiMe₂tBu, (EtO)Me₂Si—CH₂—S—SiMe₂tBu, (PrO)Me₂Si—CH₂—S—SiMe₂tBu, (BuO) Me₂Si—CH₂—S—SiMe₂tBu, (MeO)Me₂Si—CH₂—CMe₂—CH₂—S—SiMe₂tBu, (EtO)Me₂Si—CH₂—CMe₂—CH₂—S—SiMe₂tBu, (PrO)Me₂Si—CH₂—CMe₂—CH₂—S—SiMe₂tBu, (BuO)Me₂Si—CH₂—CMe₂—CH₂—S—SiMe₂tBu, (MeO)Me₂Si—CH₂—C(H)Me-CH₂—S—SiMe₂tBu, (EtO)Me₂Si—CH₂—C(H)Me-CH₂—S—SiMe₂tBu, (PrO)Me₂Si—CH₂—C(H)Me-CH₂—S—SiMe₂tBu, (BuO)Me₂Si—CH₂—C(H)Me-CH₂—S—SiMe₂tBu.

Most preferably, the sulfanylsilane compound of formula (1) is selected from (MeO)₃Si—(CH₂)₃—S—SiMe₂tBu, (MeO)₂(CH₃)Si—(CH₂)₃—S—SiMe₂tBu, (MeO) (Me)₂Si—(CH₂)₃—S—SiMe₂tBu and mixtures thereof.

Alternatively, a compound of formula (2) may be used:

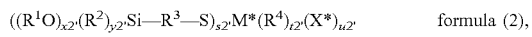

$$((R^1O)_{x2'}(R^2)_{y2'}Si—R^3—S)_{s2'}M^*(R^4)_{t2'}(X^*)_{u2'}$$ formula (2), wherein M* is silicon or tin; $x_2'$ is an integer selected from 1, 2 and 3; $y2'$ is an integer selected from 0, 1, and 2; wherein $x2'+y2'=3$; $s2'$ is an integer selected from 2, 3 and 4; $t2'$ is an integer selected from 0, 1 and 2;
$u2'$ is an integer selected from 0, 1 and 2; wherein $s2'+t2'+u2'=4$; $R^1$ is independently selected from hydrogen and $(C_1-C_6)$ alkyl; $R^2$ is independently selected from $(C_1-C_{16})$ alkyl, $(C_7-C_{16})$ alkylaryl and $(C_7-C_{16})$ arylalkyl; $R^3$ is at least divalent and is independently selected from $(C_1-C_{16})$ alkyl, $(C_8-C_{16})$ alkylarylalkyl, $(C_7-C_{16})$ arylalkyl and $(C_7-C_{16})$ alkylaryl, and each group may be substituted with one or more of the following groups: tertiary amine group, silyl group, $(C_7-C_{18})$ aralkyl group and $(C_6-C_{18})$ aryl group; $R^4$ is independently selected from $(C_1-C_{16})$ alkyl and $(C_7-C_{16})$ alkylaryl; X* is independently selected from chloride, bromide and —OR⁵*; wherein R⁵* is selected from $(C_1-C_{16})$ alkyl and $(C_7-C_{16})$ arylalkyl.

In a preferred embodiment, M* is a silicon atom; $R^3$ is divalent and is $(C_1-C_{16})$ alkyl; X* is —OR⁵*, wherein R⁵* is selected from $(C_1-C_4)$ alkyl; $R^1$, $R^2$, and $R^4$ are independently selected from $(C_1-C_4)$ alkyl; $s_2'$ and $t_2'$ are each 2 and $u_2'$ is 0; and $x_2'$ is 2 and $y_2'$ is 1; and the remaining groups and parameters are as defined for formula (2).

Specific preferred species of the silane sulfide modification agent of the present invention include the following compounds and their corresponding Lewis base adducts: (MeO)₃Si—(CH₂)₃—S—Si(Me)₂—S—(CH₂)₃—Si(OMe)₃, (MeO)₃Si—(CH₂)₃—S—Si(Et)₂—S—(CH₂)₃—Si(OMe)₃, (MeO)₃Si—(CH₂)₃—S—Si(Bu)₂—S—(CH₂)₃—Si(OMe)₃, (EtO)₃Si—(CH₂)₃—S—Si(Me)₂—S—(CH₂)₃—Si(OEt)₃, (EtO)₃Si—(CH₂)₃—S—Si(Et)₂—S—(CH₂)₃—Si(OEt)₃, (EtO)₃Si—(CH₂)₃—S—Si(Bu)₂—S—(CH₂)₃—Si(OEt)₃, (PrO)₃Si—(CH₂)₃—S—Si(Me)₂—S—(CH₂)₃—Si(OPr), (PrO)₃Si—(CH₂)₃—S—Si(Et)₂—S—(CH₂)₃—Si(OPr)₃, (PrO)₃Si—(CH₂)₃—S—Si(Bu)₂—S—(CH₂)₃—Si(OPr)₃, (MeO)₃Si—(CH₂)₂—S—Si(Me)₂—S—(CH₂)₂—Si(OMe)₃, (MeO)₃Si—(CH₂)₂—S—Si(Et)₂—S—(CH₂)₂—Si(OMe)₃, (MeO)₃Si—(CH₂)₂—S—Si(Bu)₂—S—(CH₂)₂—Si(OMe)₃, (EtO)₃Si—(CH₂)₂—S—Si(Me)₂—S—(CH₂)₂—Si(OEt)₃, (EtO)₃Si—(CH₂)₂—S—Si(Et)₂—S—(CH₂)₂—Si(OEt)₃, (EtO)₃Si—(CH₂)₂—S—Si(Bu)₂—S—(CH₂)₂—Si(OEt)₃, (PrO)₃Si—(CH₂)₂—S—Si(Me)₂—S—(CH₂)₂—Si(OPr)₃, (PrO)₃Si—(CH₂)₂—S—Si(Et)₂—S—(CH₂)₂—Si(OPr)₃, (PrO)₃Si—(CH₂)₂—S—Si(Bu)₂—S—(CH₂)₂—Si(OPr)₃, (MeO)₃Si—CH₂—S—Si(Me)₂—S—CH₂—Si(OMe)₃, (MeO)₃Si—CH₂—S—Si(Et)₂—S—CH₂—Si(OMe)₃, (MeO)₃Si—CH₂—S—Si(Bu)₂—S—CH₂—Si(OMe)₃, (EtO)₃Si—CH₂—S—Si(Me)₂—S—CH₂—Si(OEt)₃, (EtO)₃Si—CH₂—S—Si(Et)₂—S—CH₂—Si(OEt)₃, (EtO)₃Si—CH₂—S—Si(Bu)₂—S—CH₂—Si(OEt)₃, (PrO)₃Si—CH₂—S—Si(Me)₂—S—CH₂—Si(OPr)₃, (PrO)₃Si—CH₂—S—Si(Et)₂—S—CH₂—Si(OPr)₃, (PrO)₃Si—CH₂—S—Si(Bu)₂—S—CH₂—Si(OPr)₃, (MeO)₃Si—CH₂—CMe₂—CH₂—S—Si(Me)₂—S—CH₂—CMe₂—CH₂—Si(OMe)₃, (MeO)₃Si—CH₂—CMe₂—CH₂—S—Si(Et)₂—S—CH₂—CMe₂—CH₂—Si(OMe)₃, (MeO)₃Si—CH₂—CMe₂—CH₂—S—Si(Bu)₂—S—CH₂—CMe₂—CH₂—Si(OMe)₃, (EtO)₃Si—CH₂—CMe₂—CH₂—S—Si(Me)₂—S—CH₂—CMe₂—CH₂—Si(OEt)₃, (EtO)₃Si—CH₂—CMe₂—CH₂—S—Si(Et)₂—S—CH₂—CMe₂—CH₂—Si(OEt)₃, (EtO)₃Si—CH₂—CMe₂—CH₂—S—Si(Bu)₂—S—CH₂—CMe₂—CH₂—Si(OEt)₃, (PrO)₃Si—CH₂—CMe₂—CH₂—S—Si(Me)₂—S—CH₂—CMe₂—CH₂—Si(OPr)₃, (PrO)₃Si—CH₂—CMe₂—CH₂—S—Si(Et)₂—S—CH₂—CMe₂—CH₂—Si(OPr)₃, (PrO)₃Si—CH₂—CMe₂—CH₂—S—Si(Bu)₂—S—CH₂—CMe₂—CH₂—Si(OPr)₃, (MeO)₃Si—CH₂—C(H)Me-CH₂—S—Si(Me)₂—S—CH₂—C(H)Me-CH₂—Si(OMe)₃, (MeO)₃Si—CH₂—C(H)Me-CH₂—S—Si(Et)₂—S—CH₂—C(H)Me-CH₂—Si(OMe)₃, (MeO)₃Si—CH₂—C(H)Me-CH₂—S—Si(Bu)₂—S—CH₂—C(H)Me-CH₂—Si(OMe)₃, (EtO)₃Si—CH₂—C(H)Me-CH₂—S—Si(Me)₂—S—CH₂—C(H)Me-CH₂—Si(OEt)₃, (EtO)₃Si—CH₂—C(H)Me-CH₂—S—Si(Et)₂—S—CH₂—C(H)Me-CH₂—Si(OEt)₃, (EtO)₃Si—CH₂—C(H)Me-CH₂—S—Si(Bu)₂—S—CH₂—C(H)Me-CH₂—Si(OEt)₃, (PrO)₃Si—CH₂—C(H)Me-CH₂—S—Si(Me)₂—S—CH₂—C(H)Me-CH₂—Si(OPr)₃, (PrO)₃Si—CH₂—C(H)Me-CH₂—S—Si(Et)₂—S—CH₂—C(H)Me-CH₂—Si(OPr)₃, (PrO)₃Si—CH₂—C(H)Me-CH₂—S—Si(Bu)₂—S—CH₂—C(H)Me-CH₂—Si(OPr)₃, (MeO)₂(Me)Si—(CH₂)₃—S—Si(Me)₂—S—(CH₂)₃—Si(OMe)₂(Me), (MeO)₂(Me)Si—(CH₂)₃—

S—Si(Et)$_2$—S—(CH$_2$)$_3$—Si(OMe)$_2$(Me), (MeO)$_2$(Me)Si—(CH$_2$)$_3$—S—Si(Bu)$_2$—S—(CH$_2$)$_3$—Si(OMe)$_2$(Me), (EtO)$_2$(Me)Si—(CH$_2$)$_3$—S—Si(Me)$_2$—S—(CH$_2$)$_3$—Si(OEt)$_2$(Me), (EtO)$_2$(Me)Si—(CH$_2$)$_3$—S—Si(Et)$_2$—S—(CH$_2$)$_3$—Si(OEt)$_2$(Me), (EtO)$_2$(Me)Si—(CH$_2$)$_3$—S—Si(Bu)$_2$—S—(CH$_2$)$_3$—Si(OEt)$_2$(Me), (PrO)$_2$(Me)Si—(CH$_2$)$_3$—S—Si(Me)$_2$—S—(CH$_2$)$_3$—Si(OPr)$_2$(Me), (PrO)$_2$(Me)Si—(CH$_2$)$_3$—S—Si(Et)$_2$—S—(CH$_2$)$_3$—Si(OPr)$_2$(Me), (PrO)$_2$(Me)Si—(CH$_2$)$_3$—S—Si(Bu)$_2$—S—(CH$_2$)$_3$—Si(OPr)$_2$(Me), (MeO)$_2$(Me)Si—(CH$_2$)$_2$—S—Si(Me)$_2$—S—(CH$_2$)$_2$—Si(OMe)$_2$(Me), (MeO)$_2$(Me)Si—(CH$_2$)$_2$—S—Si(Et)$_2$—S—(CH$_2$)$_2$—Si(OMe)$_2$(Me), (MeO)$_2$(Me)Si—(CH$_2$)$_2$—S—Si(Bu)$_2$—S—(CH$_2$)$_2$—Si(OMe)$_2$(Me), (EtO)$_2$(Me)Si—(CH$_2$)$_2$—S—Si(Me)$_2$—S—(CH$_2$)$_2$—Si(OEt)$_2$(Me), (EtO)$_2$(Me)Si—(CH$_2$)$_2$—S—Si(Et)$_2$—S—(CH$_2$)$_2$—Si(OEt)$_2$(Me), (EtO)$_2$(Me)Si—(CH$_2$)$_2$—S—Si(Bu)$_2$—S—(CH$_2$)$_2$—Si(OEt)$_2$(Me), (PrO)$_2$(Me)Si—(CH$_2$)$_2$—S—Si(Me)$_2$—S—(CH$_2$)$_2$—Si(OPr)$_2$(Me), (PrO)$_2$(Me)Si—(CH$_2$)$_2$—S—Si(Et)$_2$—S—(CH$_2$)$_2$—Si(OPr)$_2$(Me), (PrO)$_2$(Me)Si—(CH$_2$)$_2$—S—Si(Bu)$_2$—S—(CH$_2$)$_2$—Si(OPr)$_2$(Me), (MeO)$_2$(Me)Si—CH$_2$—S—Si(Me)$_2$—S—CH$_2$—Si(OMe)$_2$(Me), (MeO)$_2$(Me)Si—CH$_2$—S—Si(Et)$_2$—S—CH$_2$—Si(OMe)$_2$(Me), (MeO)$_2$(Me)Si—CH$_2$—S—Si(Bu)$_2$—S—CH$_2$—Si(OMe)$_2$(Me), (EtO)$_2$(Me)Si—CH$_2$—S—Si(Me)$_2$—S—CH$_2$—Si(OEt)$_2$(Me), (EtO)$_2$(Me)Si—CH$_2$—S—Si(Et)$_2$—S—CH$_2$—Si(OEt)$_2$(Me), (EtO)$_2$(Me)Si—CH$_2$—S—Si(Bu)$_2$—S—CH$_2$—Si(OEt)$_2$(Me), (PrO)$_2$(Me)Si—CH$_2$—S—Si(Me)$_2$—S—CH$_2$—Si(OPr)$_2$(Me), (PrO)$_2$(Me)Si—CH$_2$—S—Si(Et)$_2$—S—CH$_2$—Si(OPr)$_2$(Me), (PrO)$_2$(Me)Si—CH$_2$—S—Si(Bu)$_2$—S—CH$_2$—Si(OPr)$_2$(Me), (MeO)$_2$(Me)Si—CH$_2$—CMe$_2$—CH$_2$—S—Si(Me)$_2$—S—CH$_2$—CMe$_2$—CH$_2$—Si(OMe)$_2$(Me), (MeO)$_2$(Me)Si—CH$_2$—CMe$_2$—CH$_2$—S—Si(Et)$_2$—S—CH$_2$—CMe$_2$—CH$_2$—Si(OMe)$_2$(Me), (MeO)$_2$(Me)Si—CH$_2$—CMe$_2$—CH$_2$—S—Si(Bu)$_2$—S—CH$_2$—CMe$_2$—CH$_2$—Si(OMe)$_2$(Me), (EtO)$_2$(Me)Si—CH$_2$—CMe$_2$—CH$_2$—S—Si(Me)$_2$—S—CH$_2$—CMe$_2$—CH$_2$—Si(OEt)$_2$(Me), (EtO)$_2$(Me)Si—CH$_2$—CMe$_2$—CH$_2$—S—Si(Et)$_2$—S—CH$_2$—CMe$_2$—CH$_2$—Si(OEt)$_2$(Me), (EtO)$_2$(Me)Si—CH$_2$—CMe$_2$—CH$_2$—S—Si(Bu)$_2$—S—CH$_2$—CMe$_2$—CH$_2$—Si(OEt)$_2$(Me), (PrO)$_2$(Me)Si—CH$_2$—CMe$_2$—CH$_2$—S—Si(Me)$_2$—S—CH$_2$—CMe$_2$—CH$_2$—Si(OPr)$_2$(Me), (PrO)$_2$(Me)Si—CH$_2$—CMe$_2$—CH$_2$—S—Si(Et))$_2$—S—CH$_2$—CMe$_2$—CH$_2$—Si(OPr)$_2$(Me), (PrO)$_2$(Me)Si—CH$_2$—CMe$_2$—CH$_2$—S—Si(Bu)$_2$—S—CH$_2$—CMe$_2$—CH$_2$—Si(OPr)$_2$(Me), (MeO)$_2$(Me)Si—CH$_2$—C(H)Me-CH$_2$—S—Si(Me)$_2$—S—CH$_2$—C(H)Me-CH$_2$—Si(OMe)$_2$(Me), (MeO)$_2$(Me)Si—CH$_2$—C(H)Me-CH$_2$—S—Si(Et)$_2$—S—CH$_2$—C(H)Me-CH$_2$—Si(OMe)$_2$(Me), (MeO)$_2$(Me)Si—CH$_2$—C(H)Me-CH$_2$—S—Si(Bu)$_2$—S—CH$_2$—C(H)Me-CH$_2$—Si(OMe)$_2$(Me), (EtO)$_2$(Me)Si—CH$_2$—C(H)Me-CH$_2$—S—Si(Me)$_2$—S—CH$_2$—C(H)Me-CH$_2$—Si(OEt)$_2$(Me), (EtO)$_2$(Me)Si—CH$_2$—C(H)Me-CH$_2$—S—Si(Et)$_2$—S—CH$_2$—C(H)Me-CH$_2$—Si(OEt)$_2$(Me), (EtO)$_2$(Me)Si—CH$_2$—C(H)Me-CH$_2$—S—Si(Bu)$_2$—S—CH$_2$—C(H)Me-CH$_2$—Si(OEt)$_2$(Me), (PrO)$_2$(Me)Si—CH$_2$—C(H)Me-CH$_2$—S—Si(Me)$_2$—S—CH$_2$—C(H)Me-CH$_2$—Si(OPr)$_2$(Me), (PrO)$_2$(Me)Si—CH$_2$—C(H)Me-CH$_2$—S—Si(Et)$_2$—S—CH$_2$—C(H)Me-CH$_2$—Si(OPr)$_2$(Me), (PrO)$_2$(Me)Si—CH$_2$—C(H)Me-CH$_2$—S—Si(Bu)$_2$—S—CH$_2$—C(H)Me-CH$_2$—Si(OPr)$_2$(Me), (MeO)$_3$Si—(CH$_2$)$_3$—S—Sn(Me)$_2$—S—(CH$_2$)$_3$—Si(OMe)$_3$, (MeO)$_3$Si—(CH$_2$)$_3$—S—Sn(Et)$_2$—S—(CH$_2$)$_3$—Si(OMe)$_3$, (MeO)$_3$Si—(CH$_2$)$_3$—S—Sn(Bu)$_2$—S—(CH$_2$)$_3$—Si(OMe)$_3$, (EtO)$_3$Si—(CH$_2$)$_3$—S—Sn(Me)$_2$—S—(CH$_2$)$_3$—Si(OEt)$_3$, (EtO)$_3$Si—(CH$_2$)$_3$—S—Sn(Et)$_2$—S—(CH$_2$)$_3$—Si(OEt)$_3$, (EtO)$_3$Si—(CH$_2$)$_3$—S—Sn(Bu)$_2$—S—(CH$_2$)$_3$—Si(OEt)$_3$, (PrO)$_3$Si—(CH$_2$)$_3$—S—Sn(Me)$_2$—S—(CH$_2$)$_3$—Si(OPr), (PrO)$_3$Si—(CH$_2$)$_3$—S—Sn(Et)$_2$—S—(CH$_2$)$_3$—Si(OPr)$_3$, (PrO)$_3$Si—(CH$_2$)$_3$—S—Sn(Bu)$_2$—S—(CH$_2$)$_3$—Si(OPr)$_3$, (MeO)$_3$Si—(CH$_2$)$_2$—S—Sn(Me)$_2$—S—(CH$_2$)$_2$—Si(OMe)$_3$, (MeO)$_3$Si—(CH$_2$)$_2$—S—Sn(Et)$_2$—S—(CH$_2$)$_2$—Si(OMe)$_3$, (MeO)$_3$Si—(CH$_2$)$_2$—S—Sn(Bu)$_2$—S—(CH$_2$)$_2$—Si(OMe)$_3$, (EtO)$_3$Si—(CH$_2$)$_2$—S—Sn(Me)$_2$—S—(CH$_2$)$_2$—Si(OEt)$_3$, (EtO)$_3$Si—(CH$_2$)$_2$—S—Sn(Et)$_2$—S—(CH$_2$)$_2$—Si(OEt)$_3$, (EtO)$_3$Si—(CH$_2$)$_2$—S—Sn(Bu)$_2$—S—(CH$_2$)$_2$—Si(OEt)$_3$, (PrO)$_3$Si—(CH$_2$)$_2$—S—Sn(Me)$_2$—S—(CH$_2$)$_2$—Si(OPr)$_3$, (PrO)$_3$Si—(CH$_2$)$_2$—S—Sn(Et)$_2$—S—(CH$_2$)$_2$—Si(OPr)$_3$, (PrO)$_3$Si—(CH$_2$)$_2$—S—Sn(Bu)$_2$—S—(CH$_2$)$_2$—Si(OPr)$_3$, (MeO)$_3$Si—CH$_2$—S—Sn(Me)$_2$—S—CH$_2$—Si(OMe)$_3$, (MeO)$_3$Si—CH$_2$—S—Sn(Et)$_2$—S—CH$_2$—Si(OMe)$_3$, (MeO)$_3$Si—CH$_2$—S—Sn(Bu)$_2$—S—CH$_2$—Si(OMe)$_3$, (EtO)$_3$Si—CH$_2$—S—Sn(Me)$_2$—S—CH$_2$—Si(OEt)$_3$, (EtO)$_3$Si—CH$_2$—S—Sn(Et)$_2$—S—CH$_2$—Si(OEt)$_3$, (EtO)$_3$Si—CH$_2$—S—Sn(Bu)$_2$—S—CH$_2$—Si(OEt)$_3$, (PrO)$_3$Si—CH$_2$—S—Sn(Me)$_2$—S—CH$_2$—Si(OPr)$_3$, (PrO)$_3$Si—CH$_2$—S—Sn(Et)$_2$—S—CH$_2$—Si(OPr)$_3$, (PrO)$_3$Si—CH$_2$—S—Sn(Bu)$_2$—S—CH$_2$—Si(OPr)$_3$, (MeO)$_3$Si—CH$_2$—CMe$_2$—CH$_2$—S—Sn(Me)$_2$—S—CH$_2$—CMe$_2$—CH$_2$—Si(OMe)$_3$, (MeO)$_3$Si—CH$_2$—CMe$_2$—CH$_2$—S—Sn(Et)$_2$—S—CH$_2$—CMe$_2$—CH$_2$—Si(OMe)$_3$, (MeO)$_3$Si—CH$_2$—CMe$_2$—CH$_2$—S—Sn(Bu)$_2$—S—CH$_2$—CMe$_2$—CH$_2$—Si(OMe)$_3$, (EtO)$_3$Si—CH$_2$—CMe$_2$—CH$_2$—S—Sn(Me)$_2$—S—CH$_2$—CMe$_2$—CH$_2$—Si(OEt)$_3$, (EtO)$_3$Si—CH$_2$—CMe$_2$—CH$_2$—S—Sn(Et)$_2$—S—CH$_2$—CMe$_2$—CH$_2$—Si(OEt)$_3$, (EtO)$_3$Si—CH$_2$—CMe$_2$—CH$_2$—S—Sn(Bu)$_2$—S—CH$_2$—CMe$_2$—CH$_2$—Si(OEt)$_3$, (PrO)$_3$Si—CH$_2$—CMe$_2$—CH$_2$—S—Sn(Me)$_2$—S—CH$_2$—CMe$_2$—CH$_2$—Si(OPr)$_3$, (PrO)$_3$Si—CH$_2$—CMe$_2$—CH$_2$—S—Sn(Et)$_2$—S—CH$_2$—CMe$_2$—CH$_2$—Si(OPr)$_3$, (PrO)$_3$Si—CH$_2$—CMe$_2$—CH$_2$—S—Sn(Bu)$_2$—S—CH$_2$—CMe$_2$—CH$_2$—Si(OPr)$_3$, (MeO)$_3$Si—CH$_2$—C(H)Me-CH$_2$—S—Sn(Me)$_2$—S—CH$_2$—C(H)Me-CH$_2$—Si(OMe)$_3$, (MeO)$_3$Si—CH$_2$—C(H)Me-CH$_2$—S—Sn(Et)$_2$—S—CH$_2$—C(H)Me-CH$_2$—Si(OMe)$_3$, (MeO)$_3$Si—CH$_2$—C(H)Me-CH$_2$—S—Sn(Bu)$_2$—S—CH$_2$—C(H)Me-CH$_2$—Si(OMe)$_3$, (EtO)$_3$Si—CH$_2$—C(H)Me-CH$_2$—S—Sn(Me)$_2$—S—CH$_2$—C(H)Me-CH$_2$—Si(OEt)$_3$, (EtO)$_3$Si—CH$_2$—C(H)Me-CH$_2$—S—Sn(Et)$_2$—S—CH$_2$—C(H)Me-CH$_2$—Si(OEt)$_3$, (EtO)$_3$Si—CH$_2$—C(H)Me-CH$_2$—S—Sn(Bu)$_2$—S—CH$_2$—C(H)Me-CH$_2$—Si(OEt)$_3$, (PrO)$_3$Si—CH$_2$—C(H)Me-CH$_2$—S—Sn(Me)$_2$—S—CH$_2$—C(H)Me-CH$_2$—Si(OPr)$_3$, (PrO)$_3$Si—CH$_2$—C(H)Me-CH$_2$—S—Sn(Et)$_2$—S—CH$_2$—C(H)Me-CH$_2$—Si(OPr)$_3$, (PrO)$_3$Si—CH$_2$—C(H)Me-CH$_2$—S—Sn(Bu)$_2$—S—CH$_2$—C(H)Me-CH$_2$—Si(OPr)$_3$, (MeO)$_2$(Me)Si—(CH$_2$)$_3$—S—Sn(Me)$_2$—S—(CH$_2$)$_3$—Si(OMe)$_2$(Me), (MeO)$_2$(Me)Si—(CH$_2$)$_3$—S—Sn(Et)$_2$—S—(CH$_2$)$_3$—Si(OMe)$_2$(Me), (MeO)$_2$(Me)Si—(CH$_2$)$_3$—S—Sn(Bu)$_2$—S—(CH$_2$)$_3$—Si(OMe)$_2$(Me), (EtO)$_2$(Me)Si—(CH$_2$)$_3$—S—Sn(Me)$_2$—S—(CH$_2$)$_3$—Si(OEt)$_2$(Me), (EtO)$_2$(Me)Si—(CH$_2$)$_3$—S—Sn(Et)$_2$—S—(CH$_2$)$_3$—Si(OEt)$_2$(Me), (EtO)$_2$(Me)Si—(CH$_2$)$_3$—S—Sn(Bu)$_2$—S—(CH$_2$)$_3$—Si(OEt)$_2$(Me), (PrO)$_2$(Me)Si—(CH$_2$)$_3$—S—Sn(Me)$_2$—S—(CH$_2$)$_3$—Si(OPr)$_2$(Me), (PrO)$_2$(Me)Si—(CH$_2$)$_3$—S—Sn(Et)$_2$—S—(CH$_2$)$_3$—Si(OPr)$_2$(Me), (PrO)$_2$(Me)Si—(CH$_2$)$_3$—S—Sn(Bu)$_2$—S—(CH$_2$)$_3$—Si(OPr)$_2$(Me), (MeO)$_2$(Me)Si—(CH$_2$)$_2$—S—Sn(Me)$_2$—S—(CH$_2$)$_2$—Si(OMe)$_2$(Me), (MeO)$_2$(Me)Si—(CH$_2$)$_2$—S—Sn(Et)$_2$—S—(CH$_2$)$_2$—Si(OMe)$_2$(Me), (MeO)$_2$(Me)Si—(CH$_2$)$_2$—S—Sn(Bu)$_2$—S—(CH$_2$)$_2$—Si(OMe)$_2$(Me), (EtO)$_2$(Me)Si—(CH$_2$)$_2$—S—Sn(Me)$_2$—S—(CH$_2$)$_2$—Si(OEt)$_2$(Me), (EtO)$_2$(Me)Si—(CH$_2$)$_2$—S—Sn(Et)$_2$—S—(CH$_2$)$_2$—Si(OEt)$_2$(Me), (EtO)$_2$(Me)Si—(CH$_2$)$_2$—S—Sn(Bu)$_2$—S—(CH$_2$)$_2$—Si(OEt)$_2$(Me), (PrO)$_2$(Me)Si—(CH$_2$)$_2$—S—Sn(Me)$_2$—S—(CH$_2$)$_2$—Si(OPr)$_2$(Me), (PrO)$_2$ (Me)Si—(CH$_2$)$_2$—S—Sn(Et)$_2$—S—(CH$_2$)$_2$—Si(OPr)$_2$(Me), (PrO)$_2$(Me)Si—(CH$_2$)$_2$—S—Sn(Bu)$_2$—S—(CH$_2$)$_2$—Si(OPr)$_2$(Me), (MeO)$_2$(Me)Si—CH$_2$—S—Sn(Me)$_2$—S—CH$_2$—Si(OMe)$_2$(Me), (MeO)$_2$(Me)Si—CH$_2$—S—Sn(Et)$_2$—S—CH$_2$—Si(OMe)$_2$(Me), (MeO)$_2$(Me)Si—CH$_2$—S—Sn(Bu)$_2$—S—CH$_2$—Si(OMe)$_2$(Me), (EtO)$_2$(Me)Si—CH$_2$—S—Sn(Me)$_2$—S—CH$_2$—Si(OEt)$_2$(Me), (EtO)$_2$(Me)Si—CH$_2$—S—Sn(Et)$_2$—S—CH$_2$—Si(OEt)$_2$(Me), (EtO)$_2$(Me)Si—CH$_2$—S—Sn(Bu)$_2$—S—CH$_2$—Si(OEt)$_2$(Me), (PrO)$_2$(Me)Si—CH$_2$—S—Sn(Me)$_2$—S—CH$_2$—Si(OPr)$_2$(Me), (PrO)$_2$(Me)Si—CH$_2$—S—Sn(Et)$_2$—S—CH$_2$—Si(OPr)$_2$(Me), (PrO)$_2$(Me)Si—CH$_2$—S—Sn(Bu)$_2$—S—CH$_2$—Si(OPr)$_2$(Me), (MeO)$_2$(Me)Si—CH$_2$—CMe$_2$—CH$_2$—S—Sn(Me)$_2$—S—CH$_2$—CMe$_2$—CH$_2$—Si(OMe)$_2$(Me), (MeO)$_2$(Me)Si—CH$_2$—CMe$_2$—CH$_2$—S—Sn(Et)$_2$—S—CH$_2$—CMe$_2$—CH$_2$—Si(OMe)$_2$(Me), (MeO)$_2$(Me)Si—CH$_2$—CMe$_2$—CH$_2$—S—Sn(Bu)$_2$—S—CH$_2$—CMe$_2$—CH$_2$—Si(OMe)$_2$(Me), (EtO)$_2$(Me)Si—CH$_2$—CMe$_2$—CH$_2$—S—Sn(Me)$_2$—S—CH$_2$—CMe$_2$—CH$_2$—Si(OEt)$_2$(Me), (EtO)$_2$(Me)Si—CH$_2$—CMe$_2$—CH$_2$—S—Sn(Et)$_2$—S—CH$_2$—CMe$_2$—CH$_2$—Si(OEt)$_2$(Me), (EtO)$_2$(Me)Si—CH$_2$—CMe$_2$—CH$_2$—S—Sn(Bu)$_2$—S—CH$_2$—CMe$_2$—CH$_2$—Si(OEt)$_2$(Me), (PrO)$_2$(Me)Si—CH$_2$—CMe$_2$—CH$_2$—S—Sn(Me)$_2$—S—CH$_2$—CMe$_2$—CH$_2$—Si(OPr)$_2$(Me), (PrO)$_2$(Me)Si—CH$_2$—CMe$_2$—CH$_2$—S—Sn(Et)$_2$—S—CH$_2$—CMe$_2$—CH$_2$—Si(OPr)$_2$(Me), (PrO)$_2$(Me)Si—CH$_2$—CMe$_2$—CH$_2$—S—Sn(Bu)$_2$—S—CH$_2$—CMe$_2$—CH$_2$—Si(OPr)$_2$(Me), (MeO)$_2$(Me)Si—CH$_2$—C(H)Me-CH$_2$—S—Sn(Me)$_2$—S—CH$_2$—C(H)Me-CH$_2$—Si(OMe)$_2$(Me), (MeO)$_2$(Me)Si—CH$_2$—C(H)Me-CH$_2$—S—Sn(Et)$_2$—S—CH$_2$—C(H)Me-CH$_2$—Si(OMe)$_2$(Me), (MeO)$_2$(Me)Si—CH$_2$—C(H)Me-CH$_2$—S—Sn(Bu)$_2$—S—CH$_2$—C(H)Me-CH$_2$—Si(OMe)$_2$(Me), (EtO)$_2$(Me)Si—CH$_2$—C(H)Me-CH$_2$—S—Sn(Me)$_2$—S—CH$_2$—C(H)Me-CH$_2$—Si(OEt)$_2$(Me), (EtO)$_2$(Me)Si—CH$_2$—C(H)Me-CH$_2$—S—Sn(Et)$_2$—S—CH$_2$—C(H)Me-CH$_2$—Si(OEt)$_2$(Me), (EtO)$_2$(Me)Si—CH$_2$—C(H)Me-CH$_2$—S—Sn(Bu)$_2$—S—CH$_2$—C(H)Me-CH$_2$—Si(OEt)$_2$(Me), (PrO)$_2$(Me)Si—CH$_2$—C(H)Me-CH$_2$—S—Sn(Me)$_2$—S—CH$_2$—C(H)Me-CH$_2$—Si(OPr)$_2$(Me), (PrO)$_2$(Me)Si—CH$_2$—C(H)Me-CH$_2$—S—Sn(Et)$_2$—S—CH$_2$—C(H)Me-CH$_2$—Si(OPr)$_2$(Me), and/or (PrO)$_2$(Me)Si—CH$_2$—C(H)Me-CH$_2$—S—Sn(Bu)$_2$—S—CH$_2$—C(H)Me-CH$_2$—Si(OPr)$_2$(Me).

Modification compounds of formula (2), as described above, are disclosed in more detail in WO 2014/040639 which is entirely incorporated by reference.

Alternatively, a compound of formula (12) may be used.

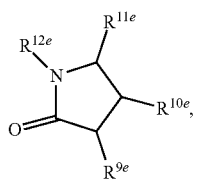

formula (12)

wherein $R^{9e}$, $R^{10e}$, $R^{11e}$ and $R^{12e}$ are independently selected from hydrogen, (C$_1$-C$_{16}$) alkyl, (C$_6$-C$_{16}$) aryl and (C$_7$-C$_{16}$) aralkyl, preferably $R^{9e}$, $R^{10e}$, $R^{11e}$ are hydrogen and $R^{12e}$ is methyl (N-methyl-pyrrolidon).

In the modification step, one or more modification compounds of formula (1), formula (2) or formula (12), as defined above, may be added to the living polymer in an amount such that the molar ratio is of from 0.05 or more, preferably of from 0.1 or more, more preferably of from 0.15 or more.

The modification compounds represented by formula (1), formula (2) or formula (12) may be preferably added at almost complete or complete conversion of the monomer(s) to be polymerized, preferably at a conversion rate of the anionic polymerization of higher than 85 percent by weight, based on the amount of monomers provided. The phrase "amount of monomers provided", "charged amount of monomers", or similar terms, as used herein, refer to the amount of monomers provided in the polymerization step. In a preferred embodiment, the conversion rate is at least 92.0 percent by weight, preferably higher than 94.0 percent by weight, based on the amount of monomers provided. The term "monomer conversion", as used herein, refers to the monomer conversion (for example the sum conversion of styrene and 1,3-butadiene) determined, e.g. at the outlet of a given polymerization reactor.

Preferably, a substantial amount of the living polymer chain ends is not terminated prior to the reaction with the modification compound, i.e. the living polymer chain ends are present and capable of reacting with the modification compound represented by formula (1), formula (2) or formula (12) in a polymer chain end modification reaction. It may be beneficial to change the polymer chain ends to dienyl chain ends before charging of the modification compounds by addition of small amounts of the conjugated diene monomer, such as 1,3-butadiene. In the course of the modification reaction, one or more polymer chain(s) may react with said modification compounds.

Thus, the modification reaction using a compound represented by formula (1), formula (2) and/or formula (12), as described above, results in modified or functionalized elastomeric polymers. In one embodiment, these elastomeric polymers have a modification degree (mol % of modified chain-ends, based on the total number of produced macromolecules) of 20% or more, preferably 50% or more, most preferably 80% or more.

The modification compound represented by formula (1), formula (2) and/or formula (12) may be directly added to the polymer solution without dilution. However, it may be beneficial to add the compounds represented by formula (1), formula (2) and/or formula (12) in solution using an inert solvent, e.g. a solvent, as described above.

In general, it is to be understood that the terms "modification" or "functionalization" may be used interchangeably.

Properties of the First Elastomeric Polymer

In one alternative embodiment, the elastomeric polymer (a) is a random co- or terpolymer obtainable by (I) anionic polymerization of at least one conjugated diene, preferably 1,3-butadiene or isoprene, with at least one α-olefin monomer, preferably with styrene and/or divinylbenzene, (II) coupling of the random or block co- or terpolymer chains obtained in (I) by addition and reaction of at least coupling agent such as a compound represented by formula (16), formula (II) and/or formula (III), as defined above and (III) modification of the coupled random co- or terpolymer chains obtained in (II) by addition and reaction of at least one or more compounds represented by formula (1), formula (2) and/or formula (12), as defined above.

Most preferably, the first elastomeric polymer (a) is a random styrene-butadiene-copolymer (herein abbreviated as SBR), a random coupled SBR or a random coupled and modified SBR using the coupling and modification agents, as described above.

The first elastomeric polymer (a), such as a styrene-butadiene-copolymer, has a number average molecular weight (herein abbreviated as $M_n$) in the range of 300,000 to 2,000,000 g/mol, more preferably in the range of 400,000 to 1,000,000 g/mol, most preferably in the range of 450,000 to 600,000 g/mol, as measured by size exclusion chromatography (herein abbreviated as SEC) and converted to polystyrene equivalents.

The elastomeric polymer (a), such as a styrene-butadiene-copolymer, has further a weight-average molecular weight (herein abbreviated as $M_w$) in the range of 350,000 to 4,000,000 g/mol, more preferably in the range of 400,000 to 2,000,000 g/mol, most preferably in the range of 500,000 to 1,000,000 g/mol, as measured by size exclusion chromatography (herein abbreviated as SEC) and converted to polystyrene equivalents.

In other words, the elastomeric polymer (a) is a high molecular weight polymer.

In one embodiment, the α-olefin-, such as styrene-, content of the elastomeric polymer (a), as defined above, ranges from 10 to 50 percent by weight. The term "α-olefin content" or "styrene-content", as used herein, refers to the mass (or weight) percentage of α-olefin or styrene in the elastomeric polymer (a), based on the total weight of the elastomeric polymer.

In one embodiment, the content of the conjugated diene monomer, such as the vinyl-content, in the first elastomeric polymer (a) is preferably from 10 to 70 percent by weight. The terms "vinyl content" or "content of the conjugated diene monomer", as used herein, refers to the mass (or weight) percentage of the at least one diene, such as e.g. 1,3-butadiene and/or isoprene, that incorporates in the polymer chain of the elastomeric polymer (a) in the 1,2- and in the 1,2- or 3,4-position, respectively, and is based on the portion of diene, e.g. butadiene and/or isoprene (total amount of polymerized diene) in the elastomeric polymer. The amount of component (a) in the polymer blend, as defined in claim 1, is in the range of 50 to 95 percent by weight, based on the total weight of the polymer blend.

It is further preferred that the elastomeric polymer (a) in the polymer blend according to the invention has a glass transition temperature (herein abbreviated as $T_g$) of −50° C. to −5° C., as measured by DSC (see test methods below). Since the first elastomeric polymer (a) is a random polymer is characterized by only one glass transition temperature as compared to e.g. a block copolymer which is typically characterized by two distinct glass transition temperatures.

Component (b)—the Low Molecular Weight Elastomeric Polymer Having a Branched or Coupled Structure Component (b) is obtainable by (i) anionic polymerization of at least one conjugated diene monomer and one or more α-olefin monomer(s) in the presence of a polymerization initiator in an organic solvent and (ii) coupling of the polymer chains obtained in (i) by a coupling agent. Further, (iii) the polymer chains obtained in (ii) may optionally be modified by a modification agent.

Preferably, the coupling rate (portion of the coupled polymer expressed in percent by weight and determined by GPC) of the second elastomeric polymer is at least 50 percent by weight, such as at least 60 percent by weight or 80 percent by weight. In general, high coupling rates (≥50% by weight) of the second elastomeric polymer result in a better wet/ice grip performance of the resulting polymer blend after vulcanization as compared to lower coupling rates (<50% by weight).

For specific monomer(s) and suitable conditions for the anionic polymerization reaction (i), the coupling reaction (ii) and the modification reaction (iii), if applicable, reference is made to the above described polymerization reaction (I), coupling reaction (II) and modification reaction (III) for the preparation of component (a). Thus, the reagent(s) and condition(s) applied for the preparation of component (b) are typically the same as disclosed above for the elastomeric polymer (a), unless otherwise indicated.

In general, the reagent(s) and condition(s) of the anionic polymerization reaction (i) are the same as discussed above for component (a), with the proviso that compounds represented by the formula (6) or formula (7) as defined above are not used as polymerization initiator.

For the optional modification reaction (iii), the reagent(s) and condition(s) of the modification reaction (iii) are the same as discussed above for component (a), with the proviso that compounds represented by the formula (1) or formula (12) as defined above are not used as modification or functionalization agent(s).

Properties of the Second Elastomeric Polymer

In one alternative embodiment, the elastomeric polymer (b) is preferably a random or block co- or terpolymer obtainable by (i) anionic polymerization of at least one conjugated diene, preferably 1,3-butadiene or isoprene, with at least one α-olefin monomer, preferably with styrene and/or divinylbenzene, (ii) coupling of the random or block co- or terpolymer chains obtained in (i) by addition and reaction of at least coupling agent such as a compound represented by formula (16), formula (II) and/or formula (III), as defined above and (iii) modification of the coupled random or block co- or terpolymer chains obtained in (ii) by addition and reaction of at least one or more compounds represented by formula (2), as defined above. Preferably, the coupling rate of the second elastomeric polymer is at least 50 percent by weight such as at least 60 percent by weight or 80 percent by weight. When coupling the second elastomeric polymer with a coupling rate of at least 50% by weight, the wet/ice grip performance of the resulting polymer blend after vulcanization is improved.

Most preferably, the second elastomeric polymer (b) is a coupled SBR or a coupled and modified SBR using the coupling and modification agents, as described above.

The second elastomeric polymer (b), such as a coupled styrene-butadiene-copolymer, has a number average molecular weight (herein abbreviated as $M_n$) in the range of 1,000 to 80,000 g/mol, more preferably in the range of 5,000 to 50,000 g/mol, most preferably in the range of 10,000 to 30.000 g/mol, as measured by size exclusion chromatography (herein abbreviated as SEC) and converted to polystyrene equivalents.

The elastomeric polymer (b), such as a coupled styrene-butadiene-copolymer, has further a weight-average molecular weight (herein abbreviated as $M_w$) in the range of 1000-140000 g/mol, more preferably in the range of 5000-90000 g/mol, most preferably in the range of 2000-40000 g/mol, as measured by size exclusion chromatography (herein abbreviated as SEC) and converted to polystyrene equivalents.

The uncoupled elastomeric polymer (b), such as a styrene-butadiene-copolymer, may further have a molecular weight (herein abbreviated as $M_P$) at the maximum of the peak in the range of 1,000 g/mol to 30,000 g/mol, more preferably in the range of 1,500 to 20,000 g/mol, most preferably in the range of 2,000 to 10,000 g/mol, as measured by size exclusion chromatography (herein abbreviated as SEC) and converted to polystyrene equivalents.

After coupling, the elastomeric polymer (b) may have further a molecular weight (herein abbreviated as $M_P$) at the maximum of the peak in the range of 2,000 g/mol to 100,000 g/mol, more preferably in the range of 3,000 to 70,000 g/mol, most preferably in the range of 4,000 to 40,000 g/mol, as measured by size exclusion chromatography (herein abbreviated as SEC) and converted to polystyrene equivalents.

In other words, the elastomeric polymer (b) is a low molecular weight polymer.

In one embodiment, the α-olefin-, such as styrene-, content of the elastomeric polymer (b), as defined above, ranges from 5 to 50 percent by weight.

In one embodiment, the content of the conjugated diene monomer, such as the vinyl-content, in the second elastomeric polymer (b) is preferably from 40 to 75 percent by weight.

The amount of component (b) in the polymer blend, as defined in claim 1, is in the range of 5 to 50 percent by weight, preferably 5 to 40 percent by weight, more preferably 10 to 35 percent by weight, based on the total weight of the polymer blend.

Component (c)—an Optionally Present (Conventional) Extender Oil Having a Low Molecular Weight Component (c) of the polymer blend, as defined in claim 1, is optionally present and corresponds to one or more extender oil(s), which are also known as softener(s).

The amount of component (c) in the polymer blend, if present, is in the range of 0 to 13 percent by weight, based on the total weight of the polymer blend. If a higher amount of component (c) is used, the parameter attributes of the crosslinked vulcanizates, comprising the polymer blend, as defined herein, especially the abrasion resistance and the grip of the polymer blend/polymer composition deteriorate, as shown in the examples.

For representative examples and classification of the extender oils, reference is made to International Patent Application No. PCT/US09/045553 and U.S. Patent Application Publication No. 2005/0159513, each of which is incorporated herein by reference in its entirety. Representative extender oils include, but are not limited to, MES (Mild Extraction Solvate), TDAE (Treated Distillate Aromatic Extract), RAE (Residual Aromatic Extract) including, without limitation, T-RAE and S-RAE, DAE including T-DAE and NAP (light and heavy naphthenic oils), including, but not limited to, Nytex 4700, Nytex 8450, Nytex 5450, Nytex 832, Tufflo 2000, and Tufflo 1200. In addition, native oils, including, but not limited to, vegetable oils, can be used as extender oils. Representative oils also include functionalized variations of the aforementioned oils, particularly epoxidized or hydroxylated oils. The aforementioned extender oils comprise different concentrations of polycyclic aromatic compounds, paraffinics, naphthenics and aromatics, and have different glass transition temperatures. The above mentioned types of oil have been characterized (*Kautschuk Gummi Kunststoffe*, vol. 52, pages 799-805). In preferred embodiments, MES, RAE and/or TDAE are used as (conventional) extender oils.

The Polymer Composition

The present invention further provides a polymer composition, comprising the polymer blend of the first aspect of the invention, as described above. This polymer composition is not cured (or crosslinked). Optionally, this non-cured polymer compositions further comprises one or more additional components selected from the group consisting of components which are added to or formed as a result of the polymerization process used for preparing the first and second elastomeric polymers; components which remain after solvent removal from the polymerization process such as antioxidant(s); and components which are added to the polymer prior to completion of the polymer manufacturing process such as antioxidant(s) or processing agent(s).

Methods for Preparing the Polymer Blend

According to the invention, the polymer blend may be prepared in solution either by in situ polymerization of both components (a) and (b), as described above, in the same process or by mixing of the respective polymer solutions, as obtained after the polymerization reaction (including the coupling and/or modification reaction, if applicable) of the corresponding components (a) and (b), as described above. The optional extender oil(s) (c), if used at all, are then mixed into the obtained polymer solution, containing both the elastomeric polymer (a) and the elastomeric polymer (b).

The amounts of each component are as defined in claim 1.

The polymer blend is then recovered from the polymer blend solution as commonly known and used in industrial scale for rubber production for instance via steam stripping at an elevated temperature, preferably about 100° C., followed by a common dewatering step and drying at elevated temperatures.

The resulting solvent-free polymer blend may preferably have a Mooney viscosity in the range of 35-80.

EXAMPLES

The following examples are provided in order to further illustrate the invention and are not to be construed as limitation of the present invention. "Room temperature" refers to a temperature of about 20° C. All polymerizations were performed in a nitrogen atmosphere under exclusion of moisture and oxygen.

Test Methods

Size Exclusion Chromatography

Molecular weight and molecular weight distribution of the polymer were each measured using size exclusion chromatography (SEC) based on polystyrene standards. Each polymer sample (9 to 11 mg) was dissolved in tetrahydrofuran (10 mL) to form a solution. The solution was filtered using a 0.45-μm filter. A 100 μL sample was fed into a GPC column (Hewlett Packard system 1100 with 3 PL gel 10 μm MIXED-B columns). Refraction Index-detection was used as the detector for analyzing the molecular weight. The molecular weight was calculated as polystyrene based on the calibration with EasiCal PS1 (Easy A and B) Polystyrene standards from Polymer Laboratories. Figures of number-average molecular weight ($M_n$) figures, weight-average molecular weight ($M_w$) and molecular weight at maximum of the peak $M_p$ are given based on the polystyrene standards. The molecular weight distribution is expressed as the dispersity $D=M_w/M_n$.

Analysis to Measure Monomer Conversion

Monomer conversion was determined by measuring the solids concentration (TSC) of the polymer solution at the end of the polymerization. The maximum solid content is obtained at 100 wt % conversion of the charged butadiene ($m_{Bd}$) and styrene ($m_{St}$) for the final polymer by $TSC_{max}=(m_{Bd}+m_{St})/(m_{Bd}+m_{St}+m_{polar\ agent}+m_{NBL}+m_{cyclohexane})*100\%$. A sample of polymer solution ranging from about 1 g to about 10 g, depending on the expected monomer conversion, was drawn from the reactor directly into a 200 mL Erlenmeyer flask filled with ethanol (50 mL). The weight of the filled Erlenmeyer flask was determined before sampling ("A") and after sampling ("B"). The precipitated polymer was removed from the ethanol by filtration on a weighted paper filter (Micro-glass fiber paper, ϕ 90 mm, MUNKTELL, weight "C"), dried at 140° C., using a moisture analyzer HR73 (Mettler-Toledo) until a mass loss of less than 1 mg within 140 seconds was achieved. Finally, a second drying period was performed using switch-off at a mass loss of less than 1 mg within 90 seconds to obtain the final mass "D" of the dry sample on the paper filter. The polymer content in the sample was calculated as TSC=(D−C)/(B−A)*100%. The final monomer conversion was calculated as $TSC/TSC_{max}*100\%$.

Measurement of the Glass (Transition) Temperature $T_g$

The glass transition temperature was determined using a DSC Q2000 device (TA instruments), as described in ISO 11357-2 (1999) under the following conditions:
 Weight: ca. 10-12 mg;
 Sample container: standard alumina pans;
 Temperature range: (−140 to 80) ° C.;
 Heating rate: 20 K/min;
 Cooling rate: free cooling;
 Purge gas: 20 ml Ar/min;
 Cooling agent: liquid nitrogen;
 Evaluation method: inflection method.

Each sample was measured at least once. The measurements contained two heating runs. The $2^{nd}$ heating run was used to determine the glass transition temperature.

$^1$H-NMR

Vinyl and total styrene contents were measured using $^1$H-NMR, following ISO 21561-2005, using a NMR spectrometer IBRUKER Avance (400 MHz), and a 5-mm dual probe. $CDCl_3$/TMS was used as solvent in a weight ratio of 0.05%:99.95%. The styrene sequences (styrene oligomers) longer than 6 styrene units based on the total styrene units (also referred to as the fraction of the block styrene (BS) in %) was estimated as recommended by Tanaka et al in Rubber Chem. and Techn. (1981), 54 (4), 685-91, i.e. the fraction of styrene sequences longer than 6 units was determined using the relative intensity of the ortho-phenyl proton signals resonated higher than 6.7 ppm. This is based on the finding that the ortho-phenyl proton, methine proton, and methylene proton signals shift to a higher magnetic field with increasing degree of polymerization. Thus, a block styrene is defined as a styrene sequence longer than 6 units.

Vulcanizate Compound Properties

Test pieces were vulcanized by t95 at 160° C. for measurement of tan δ and compound stiffness E'.

Loss Factor Tan δ and Compound Stiffness E'

The loss factor tan δ (also known as "tan d") and compound stiffness E' were measured at 0° C. using a dynamic spectrometer Eplexor 150N/500N manufactured by Gabo Qualimeter Testanlagen GmbH (Germany) applying a tension dynamic strain of 1% at a frequency of 2 Hz.

Preparation of the Polymers

High Molecular Weight Polymers A and B (Linear)

Commercial high molecular weight random polymers were used which are characterized by the following properties:

High Molecular Weight Polymer C (Random, Coupled with TMS and Modified with NMP)

19.597 kg of cyclohexane, 1999 g of butadiene, 693 g of styrene and 2.99 g of DTHFP were charged in a 40 liter reactor. The impurities in the system were titrated by stepwise addition of n-butyl lithium, the addition of butyl lithium was stopped when the yellow color of the polymer solution was recognized. The reaction mixture was heated up to 40° C. (start temperature). 24.01 g of initiator Li—$(CH_2)(Me)_2Si$—N—$(C_4H_9)_2$ in cyclohexane solution (concentration 0.3329 mmol/g) were charged to the reactor to start the polymerization. The temperature increased from 40 to 75° C. in 25 minutes. The polymerization mixture was allowed to react for 90 minutes. After this time, 1.5 g of tetramethoxysilane (TMS) in cyclohexane solution was added (0.7659 mmol/g). After 30 min, 40.8 g of butadiene were added and short after 0.9286 g of NMP solution in cyclohexane (concentration: 8.25 mmol/g). After a reaction time of 30 minutes, 37 g of methanol were added to stop the solution. The polymer solution was stabilized with 3.45 g of stearylamine (0.13 phr) and 6.8 g of Irganox 1520 (0.25 phr).

The molecular weight was determined by means of GPC with a polystyrene calibration and the following results were obtained: molecular weight at peak of the polymer before TMS coupling, $M_p$=520000 g/mol, $M_n$=514500 g/mol, $M_w$=984000 g/mol, coupling rate=42.1% by weight. The following polymer microstructure was determined with $^1$H-NMR: Styrene content: 24.9%, Vinyl content: 61.4%; Block Styrene Content: 0%; $T_g$: −22.6.

Low Molecular Weight Polymer D (Linear, Modified with NMP)

5256 g cyclohexane, 24.6955 g TMEDA and 44.31 g n-butyl lithium (3.154 mmol/g) were charged in a 10 l reactor and heated up to a start polymerization temperature of 40° C. 525 g of butadiene and 175.65 g of styrene (corresponding to a target molecular weight of 7.6 kg/mol) were charged in the reactor during 30 minutes. The temperature of the polymerization mixture increased up to 60° C. within 30 minutes. The polymerization mixture was allowed to react for additional 30 minutes at a constant temperature of 60° C. After this time, 37.73 g of butadiene were added first and then 14.405 g of NMP solution in cyclohexane (conc. 10.088 mmol/g) was added. After 60 minutes reaction time, the polymerization mixture was stopped with methanol and stabilized by addition of 0.25 phr of Irganox 1520.

The molecular weight was determined by means of GPC with a polystyrene calibration and resulted to be $M_n$=7172 g/mol, $M_w$=7757 g/mol. The following polymer microstructure was determined with $^1$H-NMR: Styrene content: 25.6%, Vinyl content: 65.9%.

| Polymer | $M_p$* | $M_n$ | $M_w$ | CR Unit | Styrene cont. | Vinyl cont. | Block Styrene | $T_g$ |
|---|---|---|---|---|---|---|---|---|
| HMW | (g/mol) | (g/mol) | (g/mol) | (%) | (%) | (%) | (%) | (° C.) |
| Polymer A** | 531,000 | 489,000 | 818,000 | 38 | 21.2 | 62.5 | 0 | −23 |
| Polymer B*** | 496,000 | 557,000 | 883,000 | 52 | 25 | 62 | 0 | −19.5 |

*Mp of uncoupled high molecular weight polymer
**High molecular weight SSBR comprised in commercial oil extended grade SLR 4633.
***High molecular weight SSBR comprised in commercial grade SLR 4630.

Low Molecular Weight Polymer E (Linear, Modified with Sulfanylsilane Compound)

5345 g cyclohexane, 142.632 g DTHFP and 317.15 g of Li—(CH$_2$) (Me)$_2$Si—N—(C$_2$H$_5$)$_2$ (0.42 mmol/g) were charged in a 10 l reactor and heated up to a start polymerization temperature of 40° C. 500.94 g of butadiene and 167.29 g of styrene (corresponding to a target molecular weight of 7.58 kg/mol) were charged in the reactor during 30 minutes. The temperature of the polymerization mixture increased up to 60° C. within 30 minutes. The polymerization mixture was allowed to react for additional 30 minutes at a constant temperature of 60° C. After this time, 36.01 g of butadiene were added first and then 41.929 g of a (MeO)$_3$Si—(CH$_2$)$_3$—S—SiMe$_2$C(Me)$_3$ solution in cyclohexane (conc. 3.45 mmol/g, M$_w$=278.61 g/mol) was added. After 60 minutes reaction time, the polymerization mixture was stopped with methanol and stabilized by addition of 0.25 phr of Irganox 1520.

The molecular weight was determined by means of GPC with a polystyrene calibration and resulted to be: M$_n$=21335 g/mol and M$_w$=18731 g/mol. The following polymer microstructure was determined with $^1$H-NMR: Styrene content: 24.6%, Vinyl content: 65.4%.

Low Molecular Weight Polymer F (Linear Polystyrene)

4,468 g of cyclohexane, 58.14 g of DTHFP and 399 g of styrene were charged in a 10 l reactor and heated up to a start polymerization temperature of 40° C. The impurities in the system were titrated by stepwise addition of n-butyl lithium, the addition of butyl lithium was stopped when the yellow colour of the polymer solution was recognized. The polymerization was started by the addition of 100.8 g of BuLi (3.13 mmol/g in cyclohexane, corresponding to a target molecular weight of 1.25 kg/mol) with a cylinder. The polymerization mixture was allowed to react for 60 minutes at a constant temperature of 40° C. The living polymer chains were terminated with methanol.

The molecular weight was determined by means of GPC with a polystyrene calibration: M$_n$=1623 g/mol and M$_w$=2111 g/mol.

Low Molecular Weight Polymer G (Coupled with TMS, Inventive)

20,555 g cyclohexane, 12.893 g of TMEDA and 31.11 g of butyl lithium solution in cyclohexane (3.1533 mmol/g) were charged in a 10 l reactor and heated up to a start polymerization temperature of 42° C. 327 g of butadiene and 106.4 g of styrene (corresponding to a target molecular weight of 4.0 kg/mol) were charged in the reactor during 30 minutes. The temperature of the polymerization mixture was kept constant at 42° C. The polymerization mixture was allowed to react for additional 30 minutes. After this time, 175.6 g of TMS solution in cylcohexane (0.1626 mmol/g) was added. After 60 minutes reaction time, 7 g of methanol were added. The polymer solution was stabilized with 0.88 g of Irganox 1520.

The molecular weight was determined by means of GPC with a polystyrene calibration. Two peaks were detected: Peak 1 (linear polymer): M$_{p1}$=5,928 g/mol; Peak 2 (coupled polymer): M$_{p2}$=18,858 g/mol. M$_n$ (referred to the whole distribution): 12,367 g/mol, M$_w$=16910 g/mol. Coupling Rate (CR)=61.4% (portion of coupled polymer), D=1.36. The following polymer microstructure was determined with $^1$H-NMR: Styrene content: 28.3%, Vinyl content: 63.6%.

Low Molecular Weight Polymer H (Coupled with TMS, Inventive)

20,212 g of cyclohexane, 1,517 g of butadiene and 506.6 g of styrene and 33.4 g of DTHFP were charged in a 10 l reactor and heated up to a start polymerization temperature of 42° C. 178.2 g of butyl lithium solution in cyclohexane (conc. 3.1533 mmol/g) was added to start the polymerization reaction. After 60 minutes, 21.4 g of TMS were added to the reaction mixture. The temperature of the polymer mixture was kept constant at 42° C. After 40 minutes reaction time 36.01 g of methanol were added. The polymer solution was stabilized with 4.05 g of Irganox 1520.

The molecular weight was determined by means of GPC with a polystyrene calibration. Two peaks were detected: Peak 1 (linear polymer): M$_{p1}$=5,934 g/mol; Peak 2 (coupled polymer): M$_{p2}$=19,022 g/mol. M$_n$ (referred to the whole distribution): 12,787 g/mol, M$_w$=17,030 g/mol. Coupling Rate (portion of coupled polymer)=83%, D=1.33. The following polymer microstructure was determined with $^1$H-NMR: Styrene content: 25.2%, Vinyl content: 62.9%.

Preparation of Polymer Blends by Blending the Polymer Solutions

Polymer blends according to the present invention were prepared using the polymer solutions, as described above. Specifically, the corresponding polymer solutions as indicated below in Table 1 were mixed to obtain a polymer blend. The polymer was then recovered from the solution via steam stripping at 100° C., milled to small crumbs and dried in an oven with air circulation at 70° C. for 30 min. Finally, the polymer crumbs were dried under ambient conditions on air until a content of residual volatiles was reached below 0.75%.

TABLE 1

Polymer blends prepared according to "blending procedure".

| Polymer | A | B | C | D | E | F | G | H | TDAE Oil |
|---|---|---|---|---|---|---|---|---|---|
| | % | % | % | % | % | % | % | % | % |
| SSBR 1 (comp.) | 77 | | | | | | | | 23 |
| SSBR 2 (comp.) | | 72.7 | | | | | | | 27.3 |
| SSBR 3 (comp.) | | | 80 | | | | | | 20 |
| SSBR 4 (comp.) | 77 | | | 23 | | | | | |
| SSBR 5 (comp.) | 77 | | | | 23 | | | | |
| SSBR 6 (comp.) | | | 80 | | | 20 | | | |
| SSBR 7 (inv.) | 77 | | | | | | 23 | | |
| SSBR 8 (inv.) | | 80 | | | | | | 20 | |
| SSBR 9 (inv.) | | | 80 | | | | | 20 | |

Comp.—Comparative
Inv.—Inventive

In Situ-Preparation of Polymer Blends
SSBR 10 (Coupling with SiCl$_4$ and TMS, Inventive)

21,015 g of cyclohexane, 448 g of butadiene and 148.7 of styrene and 9.36 g of DTHFP were charged in a 40 liter reactor. 63.79 g of buthyl lithium in cyclohexane (conc. 3.12 mmol/g, 199.9 mmol) were added with a cylinder to start the polymerization reaction. The reaction mixture was allowed to react for 30 minutes at 45° C. After this time, 43.3 g of SiCl$_4$ solution in cyclohexane (conc. 1.026 mmol/g, 47.9 mmol) were added to the reaction mixture. SiCl$_4$ was allowed to react for 20 minutes, then the low molecular weight coupled chains were formed and a portion of living chains was left for the formation of the high molecular weight polymer chains. 1,713.7 g of butadiene and 568.7 g of butadiene were added in 40 minutes. During this time the temperature increased from 45 to 75° C. After additional 30 minutes, 2.632 g of TMS (conc. 0.5575 mmol/g, 1.463 mmol) were added (coupling of high molecular weight chains). The reaction mixture was allowed to react for 20 minutes, then 12.76 g of methanol were added to stop the reaction and 5.77 g of Irganox 1520 were added for stabilization.

The molecular weight of the final polymer was measured with GPC, three peaks can be detected (Peak 1: low molecular weight coupled polymer, Peak 2: linear high molecular weight polymer, Peak 3: coupled high molecular weight polymer): Peak 1 (low molecular weight, with coupling rate of 100%): $M_p$=18600 g/mol (as polystyrene), $M_w$=18500 g/mol, Portion Peak 1: 19.9%; Peak 2 (high molecular weight linear): $M_p$=690205 g/mol (as polystyrene), Portion peak 2: 32.4%; Peak 3 (high molecular weight, coupled, coupling rate=59.6%); $M_p$=1407900 g/mol (as polystyrene), Portion peak 3: 47.7%; $M_w$ (peak 2+peak 3)=1,311,000 g/mol. The following polymer microstructure was determined with $^1$H-NMR for the low molecular polymer (Peak 1): Styrene content: 24.7%, Vinyl content: 63%. The following polymer microstructure was determined with $^1$H-NMR for the final polymer: Styrene content: 24.7%, Vinyl content: 66.4%. Block Styrene Content of the final polymer: 1%.

A single glass transition temperature of −17.6° C. was measured (indicative for the compatibility between the polymers having one single Tg).

SSBR 11 (Coupling with SiCl$_4$ and TMS, Inventive)

20,988 g of cyclohexane, 661.4 g of butadiene and 219.7 of styrene and 11.053 g of DTHFP were charged in a 40 liter reactor. 94.14 g of buthyl lithium in cyclohexane (conc. 3.12 mmol/g, 294 mmol) were added with a cylinder to start the polymerization reaction. The reaction mixture was allowed to react for 30 minutes at 45° C. After this time, 69.9 g of SiCl4 solution in cyclohexane (conc. 1.0279 mmol/g, 71.8 mmol) were added to the reaction mixture. SiCl$_4$ was allowed to react for 20 minutes, then the low molecular weight coupled chains were formed and a portion of living chains was left for the formation of the high molecular weight polymer chains. 1,497.21 g of butadiene and 469.5 g of butadiene were added in 40 minutes. During this time, the temperature increased from 45 to 75° C. After additional 30 minutes, 2.3 g of TMS (conc. 0.5575 mmol/g, 1.281 mmol) were added (coupling of high molecular weight chains). The reaction mixture was allowed to react for 20 minutes, then 18.84 g of methanol were added to stop the reaction and 5.76 g of Irganox 1520 were added for stabilization.

The molecular weight of the final polymer was measured with GPC, three peaks can be detected (Peak 1: low molecular weight coupled polymer, Peak 2: linear high molecular weight polymer, Peak 3: coupled high molecular weight polymer): Peak 1 (low molecular weight, with coupling rate of 100%): $M_P$=18338 g/mol (as polystyrene), $M_w$=18,200 g/mol; Portion Peak 1: 28.9%; Peak 2 (high molecular weight linear): $M_p$=513,598 g/mol (as polystyrene), Portion peak 2: 38.3%; Peak 3 (high molecular weight, coupled, coupling rate=46.1%); $M_p$=1,361,800 g/mol (as polystyrene), Portion peak 3: 32.8%, Mw (peak 2+peak 3)=937,000 g/mol. The following polymer microstructure was determined with $^1$H-NMR for the low molecular polymer (Peak 1): Styrene content: 25.2%, Vinyl content: 61.9%. The following polymer microstructure was determined with $^1$H-NMR for the final polymer: Styrene content: 24.8%, Vinyl content: 66.1%. Block Styrene Content of the final polymer: 1%.

A single glass transition temperature of −18.2° C. was measured (indicative for the compatibility between the polymers having one single Tg).

SSBR 12 (Comparative)

19,793 g of cyclohexane, 1,036 g of butadiene and 436.7 of styrene and 2.7285 g of DTHFP were charged in a 40 liter reactor. 15.69 g of butyl lithium in cyclohexane (conc. 3.1533 mmol/g, 49.5102 mmol) were added with a cylinder to start the polymerization reaction. The reaction mixture was allowed to react for 30 minutes at 45° C. After this time, 16.8 g of SiCl$_4$ solution in cyclohexane (conc. 0.7813 mmol/g, 11.3088 mmol) were added to the reaction mixture. SiCl$_4$ was allowed to react for 20 minutes, then the low molecular weight coupled chains were formed and a portion of living chains was left for the formation of the high molecular weight polymer chains. 863.8 g of butadiene and 367.63 g of butadiene were added in 40 minutes. During this time, the temperature increased from 45 to 75° C. After additional 30 minutes, 1.26 g of TMS (conc. 0.6858 mmol/g, 0.862 mmol) were added (coupling of high molecular weight chains). The reaction mixture was allowed to react for 20 minutes, then 3.11 g of methanol were added to stop the polymerization reaction and 5.43 g of Irganox 1520 were added for stabilization.

The molecular weight of the final polymer was measured with GPC, three peaks can be detected (Peak 1: low molecular weight coupled polymer, Peak 2: linear high molecular weight polymer, Peak 3: coupled high molecular weight polymer): Peak 1 (low molecular weight—but outside claimed range): Mp=152,829 g/mol (as polystyrene), Portion Peak 1: 28.7%; Peak 2 (high molecular weight linear): Mp=660,666 g/mol (as polystyrene) Portion peak 2: 20.7%; Peak 3 (high molecular weight coupled, coupling rate=71%); Mp=1,696,332 g/mol (as polystyrene), Portion peak 3: 50.6%; $M_w$ (peak 1+peak 2+peak 3)=752,371 g/mol. The following polymer microstructure was determined with 1H-NMR for the low molecular polymer (Peak 1): Styrene content: 29.9%, Vinyl content: 58.9%. The following polymer microstructure was determined with $^1$H-NMR for the final polymer (Peak 1): Styrene content: 29.9%, Vinyl content: 58.9%.

Block Styrene Content referred to the whole polymer: 1%.

A single glass transition temperature of −19.3° C. was measured.

TABLE 2

Overview of polymers prepared with the "in situ" procedure.

| Polymer | $M_{p1}$* LMW g/mol | Portion $P_1$ % | Sty LMW % | Vinyl LMW Unit % | Mp2 g/mol | HMW Polymer Total Portion % | $T_g$ ° C. |
|---|---|---|---|---|---|---|---|
| SSBR 10 (inv.) | 18600 | 19.9 | 25 | 62 | 690205 | 80.1 | −17.6 |
| SSBR 11 (inv.) | 18338 | 29 | 25 | 62 | 513598 | 71 | −18.5 |
| SSBR 12 (comp.) | 152829 | 29.9 | 30 | 62 | 660666 | 70.1 | −19.3 |

*Molecular weight at peak of the coupled low molecular weight polymer

Preparation of Polymer Compositions and the Corresponding Vulcanizates Via 2-Step Compounding/Crosslinking Polymer compositions were prepared using the solution styrene butadiene polymer (SSBR) materials described above. The polymer compositions were compounded by kneading according to the formulations shown in Table 1 in a standard two-step compound recipe with silica as filler in an internal lab mixer comprising a Banbury rotor type with a total chamber volume of 370 cm$^3$. The reagents used are as follows:

C. The compound from first mixing step, sulphur as vulcanizing agent and the accelerators DPG and TBBS were added and mixed for a total time of 3 min.

Preparation of Polymer Compositions and the Corresponding Vulcanizates Via 3-Step Compounding/Crosslinking The polymer compositions described in Table 4 were prepared with a three-step compound recipe with silica as filler in an internal lab mixer comprising Banbury rotor type with a total chamber volume of 370 cm$^3$.

TABLE 3

Compound Formulations.

| Mixing: Stage | | | | Formulation | | | |
|---|---|---|---|---|---|---|---|
| | | | | 1 | 2 | 3 | 4 |
| | | | | \multicolumn{3}{c}{Comparison/Example} | |
| | | | | Comp. 1 | Comp. 2 | Comp. 3 | Ex. 1 |
| 1 | SSBR Type: | | | SSBR1 | SSBR4 | SSBR5 | SSBR7 |
| | Amount$^{(a)}$ | | phr | 100 | 100 | 100 | 100 |
| | Buna ® cis 132-Schkopau$^1$ | | phr | 20 | 20 | 20 | 20 |
| | Silica (Ultrasil 7000GR)$^2$ | | phr* | 77.42 | 77.40 | 77.40 | 77.40 |
| | Silane (Si 75 ®)$^3$ | | phr* | 6.68 | 6.678 | 6.678 | 6.678 |
| | Stearic acid$^4$ | | phr* | 0.97 | 0.965 | 0.965 | 0.965 |
| | Zinc oxide$^5$ | | phr* | 1.93 | 1.937 | 1.937 | 1.937 |
| | Antioxidant (Dusantox ® 6PPD)$^6$ | | phr* | 2.42 | 2.417 | 2.417 | 2.417 |
| | Wax Antilux 654$^7$ | | phr* | 1.45 | 1.451 | 1.451 | 1.451 |
| 2 | Sulfur$^8$ | | phr* | 1.3 | 1.3 | 1.3 | 1.3 |
| | Accelerator (TBBS)$^9$ | | phr* | 1.6 | 1.6 | 1.6 | 1.6 |
| | Accelerator (DPG)$^{10}$ | | phr* | 1.3 | 1.3 | 1.3 | 1.3 |

$^{(a)}$Amount given without extender oil resp. low molecular weight polymer;
*phr = parts per hundred rubber, based on sum weight of the solution styrene butadiene copolymer (SSBR without extender oil) and high cis 1,4-polybutadiene (Buna ® cis 132-Schkopau);
$^1$TrinseoDeutschland GmbH;
$^2$Evonik Industries AG
$^3$Bis(triethoxysilylpropyl)disulfan, sulfur equivalents per molecule: 2.35; Evonik Industries AG;
$^4$Cognis GmbH;
$^5$Grillo-Zinkoxid GmbH;
$^6$N-(1,3-dimethylbutyl)-N'-phenyl-1,4-benzenediamine, Duslo, a.s.;
$^7$Light & ozone protective wax, Rhein Chemie Rheinau GmbH
$^8$Solvay AG;
$^9$N-tert-Butyl-2-benzothiazyl-sulfenamide; Rhein Chemie Rheinau GmbH;
$^{10}$Diphenylguanidine, Vulkacit DZ/EG-C, Lanxess AG The first mixing step was performed with a filling degree of 72% using an initial temperature of 50° C. After adding the polymer composition, the filler and all other ingredients described in the formulations for step 1, the rotor speed of the internal mixer is controlled to reach a temperature range between 145° C.-160° C. for up to 4 minutes, so that the silanization reaction can occur. The total mixing time for the first step is 7 min. After dumping the compound, the mixture is cooled down and stored for relaxing before adding the curing system in the second mixing step.

The second mixing step was done in the same equipment by using a fill factor of 69% at an initial temperature of 50°

After dumping the compound from the first step, the compound is cooled down and stored for relaxing before adding the curing system in the second mixing step. After 16 hours the second mixing step was performed in the same equipment. In this step, ZnO and the antioxidant 6PPD were added. The curative ingredients were added in the third mixing step. The detailed amounts for each compound preparation step and ingredients are reported in Table 4.

The reagents used are as follows:

TABLE 4

Compounds prepared according to 3-step compounding/crosslinking procedure.

| Mixing | | | | Formulation | | | | |
|---|---|---|---|---|---|---|---|---|
| | | | | 5 (comp. 4) | 6 (Comp. 5) | 7 (comp. 6) | 8 (Ex. 2) | 9 (Comp. 7) |
| 1 | SSBR. | | | SSBR 2 | SSBR 3 | SSBR 6 | SSBR 11 | SSBR12 |
| | Amount (a) | | phr | 100 | 100 | 100 | 100 | 100 |
| | CB29 (Oil extended Nd-BR)$^1$ | | phr | 80 | 80 | 80 | 80 | 80 |
| | SMR GP (Natural Rubber)$^2$ | | phr | 40 | 40 | 40 | 40 | 40 |
| | Silica (7000GR Evonik)$^3$ | | phr | 140 | 140 | 140 | 140 | 140 |
| | Silane (Si 69 ®, Evonik)$^4$ | | phr | 11.2 | 11.2 | 11.2 | 11.2 | 11.2 |

TABLE 4-continued

Compounds prepared according to 3-step compounding/crosslinking procedure.

| Mixing | | | 5 (comp. 4) | 6 (Comp. 5) | 7 (comp. 6) | 8 (Ex. 2) | 9 (Comp. 7) |
|---|---|---|---|---|---|---|---|
| | N234[5] | phr | 4.00 | 4.00 | 4.00 | 4.00 | 4.00 |
| | Stearic acid[6] | phr | 4.00 | 4.00 | 4.00 | 4.00 | 4.00 |
| | TDAE Viva Tec 500[7] | phr | 30.00 | 30.00 | 30.00 | 30.00 | 30.00 |
| | Struktol PE wax 97HM[8] | | 2.50 | 2.50 | 2.50 | 2.50 | 2.50 |
| 2 | Antioxidant (Dusantox ® 6PPD)[9] | phr | 6.82 | 6.82 | 6.82 | 6.82 | 6.82 |
| | ZnO[10] | phr | 4.68 | 4.68 | 4.68 | 4.68 | 4.68 |
| 3 | Sulfur[11] | phr | 1.91 | 1.91 | 1.91 | 1.91 | 1.91 |
| | Renogran TBzTD-70[12] | phr | 1.38 | 1.38 | 1.38 | 1.38 | 1.38 |
| | Accelerator (TBBS)[13] | phr | 4.8 | 4.8 | 4.8 | 4.8 | 4.8 |
| | Richon PVI-OP[14] | phr | 0.76 | 0.76 | 0.76 | 0.76 | 0.76 |

(a) Amount given without extender oil resp. low molecular weight polymer;
[1]Lanxess GmbH;
[2]Malaysia;
[3]Evonik Industries AG;
[4]Bis (triethoxysilylpropyl)disulfan, sulfur equivalents per molecule: 2.35; Evonik Industries AG;
[5]Birla Group;
[6]Cognis GmbH;
[7]Hansen & Rosenthal KG;
[8]Schill & Seilacher GmbH;
[9]N-(1,3-dimethylbutyl)-N'-phenyl-1,4-benzenediamine, Duslo, a.s.; Light & ozone protective wax, Rhein Chemie Rheinau GmbH
[10]Grillo-Zinkoxid GmbH;
[11]Solvay AG;
[12]Rhein Chemie GmbH;
[13] N-tert-Butyl-2-benzothiazyl-sulfenamide; Rhein Chemie Rheinau GmbH;
[14]Dalian Richon Chem. Co. Ltd.

The resulting vulcanizates were investigated regarding their vulcanizate performance.

Results

Properties of the silica-filled vulcanizates are shown in Tables 5 and 6 for the SSBR extended with low molecular weight polymer being coupled according to the invention. The new inventive formulation 4 (Compound 4 prepared with SSBR 7) shows a significant reduction in compound stiffness E' at 0° C. in combination with a tan delta at 0° C. which is at least in the same range or even improved compared to formulations 1-3 including the reference SSBR samples comprising standard TDAE oil or linear low molecular weight SSBR (SSBR 1, SSBR4 and SSBR5).

TABLE 5

Key performance attributes of the crosslinked rubber compositions.

| | Formulation | | | |
|---|---|---|---|---|
| | 1 | 2 | 3 | 4 |
| | Comparison/Inventive | | | |
| | Comp. 1 SSBR1 | Comp. 2 SSBR4 | Comp. 3 SSBR5 | Ex. 1 SSBR7 |
| Mooney Viscosity Polymer Blend | 80 | 66.9 | 63.5 | 56.8 |
| Mooney Viscosity Compound | 102.9 | 125.7 | 102.3 | 116.7 |
| Delta Mooney | 22.9 | 58.8 | 38.8 | 59.9 |
| E' @ 0° C. [MPa] | 12.973 | 18.207 | 15.352 | 13.672 |
| tan d @ 0° C. | 0.482 | 0.536 | 0.501 | 0.532 |
| Bound Rubber [%] | 60.01 | 64.55 | 80.35 | 83.30 |

TABLE 6

Key performance attributes of the crosslinked rubber compositions.

| | Formulation | | | | |
|---|---|---|---|---|---|
| | 5 | 6 | 7 | 8 | 9 |
| | Comparison/Inventive | | | | |
| | Comp. 4 SSBR 2 Comp. | Comp. 5 SSBR 3 Comp. | Comp. 6 SSBR6 Comp. | Ex. 2 SSBR 11 Inventive | Comp. 7 SSBR12 Comp. |
| Mooney Viscosity Polymer Blend | 58.1 | 56.9 | 52.5 | 42.4 | 54.1 |
| Mooney Viscosity Compound | 55.2 | 59.9 | 45.7 | 48.7 | 44 |
| Delta Mooney | −2.9 | 0 | −6.8 | 6.3 | 10.1 |
| E' @ 0° C. [MPa] | 10.268 | 10.719 | 13.986 | 9.569 | 7.706 |
| tan d @ −10° C. | 0.432 | 0.480 | 0.358 | 0.512 | 0.403 |
| tan d @ 0° C. | 0.313 | 0.342 | 0.234 | 0.357 | 0.256 |
| Bound Rubber [%] | 40.543 | 43.868 | | 46.221 | |

Properties of the silica-filled vulcanizates prepared with the second compound formulation are reported in Table 6 for SSBRs extended with the low molecular weight polymer being coupled according to the invention. Also in this case, the vulcanizate compound 8 (formulation 8, prepared according to the invention with SSBR 11) shows a significant reduction in compound stiffness E' at 0° C. in combination with the highest tan delta at 0° C. Hence, the polymers prepared according to the invention displays the best balance of wet and snow grip performance when used as novel extender for high molecular weight SSBRs.

The invention claimed is:

1. A polymer blend, comprising:
   (a) 50 to 95 percent by weight of a first elastomeric polymer,
   (b) 5 to 50 percent by weight of a second elastomeric polymer;
   wherein the first elastomeric polymer is a random polymer and obtainable by (I) anionic polymerization of at least one conjugated diene monomer and one or more α-olefin monomer(s) in the presence of a polymerization initiator in an organic solvent and (II) optionally coupling of the polymer chains obtained in (I) by a coupling agent;
   wherein the second elastomeric polymer is obtainable by (i) anionic polymerization of at least one conjugated diene monomer and one or more α-olefin monomer(s) in the presence of a polymerization initiator in an organic solvent, and (ii) coupling the polymer chains obtained in (i) by a coupling agent;
   wherein the first elastomeric polymer (a) has a number average molecular weight ($M_n$) of 300,000 to 2,000,000 g/mol and a weight-average molecular weight ($M_w$) of 300,000 to 4,000,000 g/mol;
   wherein the second elastomeric polymer (b) has a number average molecular weight ($M_n$) of 1,000 to 80,000 g/mol, a weight-average molecular weight ($M_w$) in the range of 1,000-140,000 g/mol and a molecular weight at the maximum of the peak (Mp) in the range of 2,000 g/mol to 100,000 g/mol; and
   wherein the amounts of the components (a) and (b) are based on the total weight of the polymer blend.

2. The polymer blend according to claim 1, wherein the coupling rate of the second elastomeric polymer is at least 50 percent by weight.

3. The polymer blend according to claim 1, wherein (III) the polymer chain ends of the first elastomeric polymer obtained in (I) and/or (iii) the polymer chain ends of the second elastomeric polymer obtained in (i) are modified by addition and reaction of at least one compound represented by any of formula (2), as defined below;

$$((R^1O)_{x2'}(R^2)_{y2'}Si\text{---}R^3\text{---}S)_{s2'}M^*(R^4)_{t2'}(X^*)_{u2'} \quad \text{formula (2),}$$

wherein $M^*$ is silicon or tin; $x_2'$ is an integer 1, 2 or 3; $y_2'$ is an integer 0, 1, or 2; wherein $x_2'+y_2'=3$; $s_2'$ is an integer 2, 3 or 4; $t_2'$ is an integer 0, 1 and or 2; $u_2'$ is an integer 0, 1 or 2; wherein $s_2'+t_2'+u_2'=4$; $R^1$ is independently hydrogen or ($C_1$-$C_6$) alkyl; $R^2$ is independently ($C_1$-$C_{16}$) alkyl, ($C_7$-$C_{16}$) alkylaryl or ($C_7$-$C_{16}$) arylalkyl; $R^3$ is at least divalent and is independently ($C_1$-$C_{16}$) alkyl, ($C_8$-$C_{16}$) alkylarylalkyl, ($C_7$-$C_{16}$) arylalkyl or ($C_7$-$C_{16}$) alkylaryl, and each group is optionally substituted with one or more of the following groups: tertiary amine group, silyl group, ($C_7$-$C_{18}$) aralkyl group and ($C_6$-$C_{18}$) aryl group; $R^4$ is independently ($C_1$-$C_{16}$) alkyl ($C_7$-$C_{16}$) alkylaryl; $X^*$ is independently chloride, bromide or —$OR^{5*}$; wherein $R^{5*}$ is ($C_1$-$C_{16}$) alkyl or ($C_7$-$C_{16}$) arylalkyl.

4. The polymer blend according to claim 1, wherein the coupling agent is at least one compound represented by any of formula (16), formula (II) or formula (III), as defined below;

$$(R^{100})_{a100}(Z^{**})X_{b100} \quad \text{formula (16),}$$

$$(R^{100}O)_{a100}(Z^{**})X_{b100} \quad \text{formula (II),}$$

$$(R^{100}O)_{b100}(Z^{**})(R^{100})_{a100} \quad \text{formula (III),}$$

wherein $Z^{**}$ is tin or silicon; $X_{b100}$ is independently chlorine, bromine or iodine; $R^{100}$ is ($C_1$-$C_{20}$) alkyl, ($C_3$-$C_{20}$) cycloalkyl, ($C_6$-$C_{16}$) aryl or ($C_7$-$C_{16}$) aralkyl; a100 is integer 0 or 1 and b100 is an integer 3 or 4, provided that a+b=4.

5. The polymer blend according to claim 1, wherein the coupling agent is selected from the group consisting of $SiCl_4$, $Si(OCH_3)_4$ and $SnCl_4$.

6. The polymer blend according to claim 1, wherein the polymerization initiator used in (i) is n-BuLi, sec-BuLi, or tert-BuLi.

7. The polymer blend according to claim 1, wherein the polymerization initiator used in (I) is n-BuLi, sec-BuLi, tert-BuLi, Li—$(CH_2)(Me)_2Si$—N—$(C_4H_9)_2$, Li—$(CH_2)(Me)_2Si$—N—$(C_2H_5)_2$, a compound of formula (6) or formula (7), as defined below, or a Lewis base adduct thereof, or a mixture thereof;

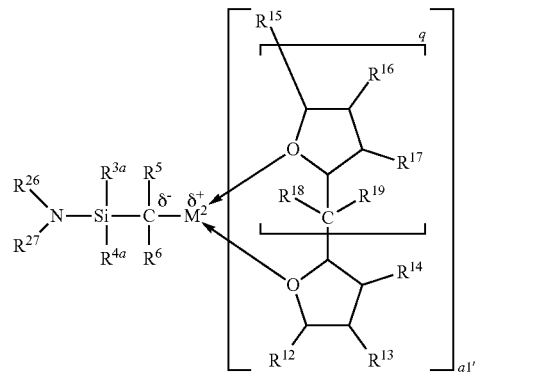

formula (6)

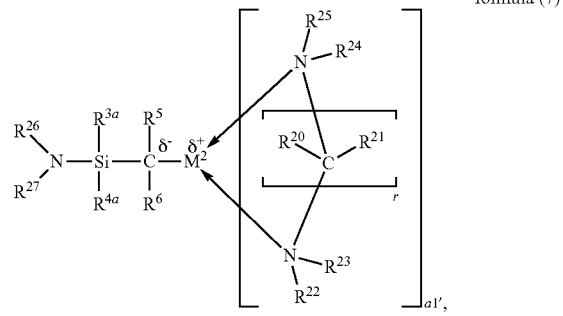

formula (7)

wherein $R^{3a}$ is independently —$N(R^{28})R^{29}$, $C_1$-$C_{18}$ alkyl, $C_6$-$C_{18}$ aryl or ($C_7$-$C_{18}$) aralkyl; $R^{4a}$ is independently $N(R^{30a})R^{31a}$, ($C_1$-$C_{18}$) alkyl, ($C_6$-$C_{18}$) aryl or ($C_7$-$C_{18}$) aralkyl; $R^5$ and $R^6$ are each independently hydrogen, $C_1$-$C_{18}$ alkyl, $C_6$-$C_{18}$ aryl or $C_7$-$C_{18}$ aralkyl; $M^2$ is lithium; $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ are each independently from hydrogen, $C_1$-$C_{18}$ alkyl, $C_6$-$C_{18}$ aryl or $C_7$-$C_{18}$ aralkyl; $R^{26}$, $R^{27}$, $R^{28}$, $R^{29}$, $R_{30a}$ and $R^{31a}$ are each independently $C_1$-$C_{18}$ alkyl, $C_6$-$C_{18}$ aryl or $C_7$-$C_{18}$ aralkyl; q is an integer 1, 2, 3, 4 or 5; r is an integer of 1, 2 or 3; and a1' is an integer 0 or 1.

8. The polymer blend according to claim 1, wherein the conjugated diene monomer is 1,3-butadiene, 2-alkyl-1,3-butadiene, 2-methyl-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene₁, and/or the ⊕-olefin monomer is styrene, 2-methylstyrene, 3-methylstyrene, 4-methylstyrene, 2,4-dimethylstyrene, 2,4,6-trimethylstyrene, ⊕-methylstyrene, stilbene, 2,4-diisopropylstyrene,4-tert-butylstyrene, vinyl benzyl dimethylamine, (4-vinylbenzyl)dimethyl aminoethyl ether, N,N-dimethylaminoethyl styrene, N,N-bis-(trialkylsilyl)aminostyrene, tert-butoxystyrene, vinylpyridine, divinylbenzene, or mixtures thereof; and/or the first elastomeric polymer (a) is a styrene-butadiene-copolymer and the second elastomeric polymer (b) is a styrene-butadiene-copolymer; and/or the ⊕-olefin content of the first elastomeric polymer is in the range of 10-50% and the vinyl content of the diene fraction of the copolymers is in the range of 10-70%; and/or the ⊕-olefin content of the second elastomeric polymer is in the range of 5-50% and the vinyl content of the diene fraction of the copolymers is in the range of 30-75%; and/or the degree of branching of the second elastomeric polymer is more than 2.

9. The polymer blend according to claim 1, wherein the anionic polymerization (I) and/or (i) is performed in the presence of at least one randomizer.

10. The polymer blend according to claim 1, further comprising (c) 0 to 13 percent by weight of one or more extender oil(s), wherein the amounts of the components (a), (b) and (c) are based on the total weight of the polymer blend.

11. The polymer blend according to claim 1, wherein (III) the polymer chain ends of the first elastomeric polymer obtained in (I) are modified by addition and reaction of at least one compound represented by any of formula (1) or formula (12), as defined below:

formula (1)

wherein each of $R^{}$ is independently $C_1$-$C_{16}$ alkyl or alkylaryl; $R^{*}$ is independently $C_1$-$C_4$ alkyl; A is $C_6$-$C_{18}$ aryl, $C_7$-$C_{50}$ alkylaryl, $C_1$-$C_{50}$ alkyl or $C_2$-$C_{50}$ dialkylether; and $R^{}$, $R^{*}$, or A are optionally independently substituted with one or more groups selected from the group consisting of $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$—$C_{12}$ alkyl)silyl)amino, tris($C_1$-$C_7$ hydrocarbyl)silyl and $C_1$-$C_{12}$ thioalkyl; x is an integer 1, 2 or 3; y is an integer 0, 1 or 2; provided that x+y=3;

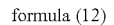
formula (12)

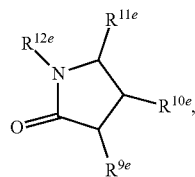

wherein $R^{9e}$, $R^{10e}$, $R^{11e}$ and d $R^{12e}$ are each independently hydrogen, ($C_1$-$C_{16}$) alkyl, ($C_6$-$C_{16}$) aryl or ($C_{07}$-$C^{16}$) aralkyl.

12. The polymer blend according to claim 11, wherein the compound represented by formula (1) is $(MeO)_3Si—(CH_2)_3—S—SiMe_2C(Me)_3$, $(MeO)_2(Me)Si—(CH_2)_3$-$SiEt_3$, $(MeO)_2(Me)Si—(CH_2)_3—S—Si(tBu)_3$, $(MeO)_2(Me)Si—(CH_2)_3—S—Si(Bz)_3$ or $(MeO)_2(Me)Si—(CH_2)_3—S—SiMe_2C(Me)_3$ and/or wherein the compound represented by formula (12) is N-methyl-2-pyrrolidon.

13. A non-cured polymer composition, comprising the polymer blend according to claim 1 and optionally further comprising one or more additional components selected from the group consisting of (i) components which are added to or formed as a result of the polymerization process used for preparing the first and second elastomeric polymers; (ii) components which remain after solvent removal from the polymerization process;

and (iii) components which are added to the polymer prior to completion of the polymer manufacturing process.

14. A method for preparing the polymer blend according to claim 1, comprising the following steps:

preparing the first elastomeric polymer by (I) anionic polymerization of at least one conjugated diene monomer and one or more α-olefin monomer(s) in the presence of a polymerization initiator in an organic solvent and (II) optionally coupling the polymer chains obtained in (I) by a coupling agent; and preparing the second elastomeric polymer by (i) anionic polymerization of at least one conjugated diene monomer and one or more α-olefin monomer(s) in the presence of a polymerization initiator in an organic solvent and (ii) coupling the polymer chains obtained in (i) by a coupling agent;

blending the first and second elastomeric polymer and optionally one or more extender oil(s);

removing solvent to provide a resulting polymer; and drying of the resulting polymer blend under heating.

15. A method for preparing the polymer blend according to claim 1, comprising the following steps:

in situ-preparing the polymer blend by (i) anionic polymerization of at least one conjugated diene monomer and one or more α-olefin monomer(s) in the presence of a polymerization initiator in an organic solvent and (ii) coupling the polymer chains obtained in (i) by a coupling agent, thereby preparing the second elastomeric polymer, and (I) addition of at least one conjugated diene monomer and one or more α-olefin monomer(s) and (II) optionally coupling the polymer chains obtained in (II) by a coupling agent, thereby preparing the first elastomeric polymer;

optionally blending one or more extender oil(s) with the in situ-prepared polymer blend;

removing solvent to provide a resulting polymer; and drying of the resulting polymer blend under heating.

16. A polymer blend obtainable according to claim 14.

17. A polymer blend obtainable according to claim 15.

* * * * *